US011916278B2

(12) United States Patent
Severin et al.

(10) Patent No.: US 11,916,278 B2
(45) Date of Patent: Feb. 27, 2024

(54) ASSEMBLIES FOR REDUCING PASSIVE INTERMODULATION IN TELECOMMUNICATIONS STRUCTURES

(71) Applicant: CommScope Technologies LLC, Hickory, NC (US)

(72) Inventors: Matthew Severin, Grapevine, TX (US); Jacob Adams, The Colony, TX (US); Brian Cross, Double Oak, TX (US); Ronald A. Vaccaro, Taylorsville, NC (US); Aviral Joshi, Chicago, IL (US)

(73) Assignee: CommScope Technologies LLC, Claremont, NC (US)

( * ) Notice: Subject to any disclaimer, the term of this patent is extended or adjusted under 35 U.S.C. 154(b) by 38 days.

(21) Appl. No.: 17/473,079

(22) Filed: Sep. 13, 2021

(65) Prior Publication Data

US 2022/0085481 A1 Mar. 17, 2022

Related U.S. Application Data

(60) Provisional application No. 63/079,493, filed on Sep. 17, 2020.

(51) Int. Cl.
*H01Q 1/12* (2006.01)

(52) U.S. Cl.
CPC ................................ *H01Q 1/1228* (2013.01)

(58) Field of Classification Search
CPC ......... H01Q 1/1228; H01Q 1/12; F16L 3/085; F16L 57/00; F16L 57/06; F16L 55/035; F16B 7/0493; F16B 7/044; Y10T 403/7194; E04G 7/14; E01F 15/141; E04H 12/2292
USPC ........ 248/200, 74.1, 55, 68.1, 65, 67.5, 74.4
See application file for complete search history.

(56) References Cited

U.S. PATENT DOCUMENTS 4,393,998 A * 7/1983 Allen ........................ F16L 3/18
248/74.1
5,192,039 A * 3/1993 Williams .............. F16L 59/135
248/62
5,215,281 A * 6/1993 Sherman .............. F16L 55/035
248/62

(Continued)

FOREIGN PATENT DOCUMENTS

CN 203879082 U 10/2014
CN 106224859 A 12/2016
CN 206134940 U 4/2017

OTHER PUBLICATIONS

PCT Notification of Transmittal of the International Search Report and the Written Opinion of the International Searching Authority, or the Declaration, dated Jan. 3, 2022, for corresponding PCT International Application No. PCT/US2021/049990.

*Primary Examiner* — Ingrid M Weinhold
(74) *Attorney, Agent, or Firm* — Myers Bigel, P.A.

(57) ABSTRACT

The present disclosure describes a telecommunications structure. The telecommunications structure includes an antenna frame including a plurality of horizontal members and a plurality of vertical members mounted on the horizontal members, wherein one or more of the vertical members are formed of a fiber-reinforced polymer and at least one piece of telecommunications equipment mounted on one of the fiber-reinforced polymer vertical members. Assemblies including passive intermodulation reducing mechanical connections are also described herein.

17 Claims, 19 Drawing Sheets

(56) References Cited

U.S. PATENT DOCUMENTS

| | | | | |
|---|---|---|---|---|
| 5,961,248 | A * | 10/1999 | Tourtellotte | F16B 7/0493 403/385 |
| 6,561,473 | B1 * | 5/2003 | Ianello | F16B 7/0493 403/384 |
| 8,087,431 | B2 * | 1/2012 | Souza | F16L 55/168 248/55 |
| 9,812,762 | B2 * | 11/2017 | Skrepcinski | F16M 11/126 |
| 10,637,226 | B2 * | 4/2020 | Bell | F16L 3/222 |
| 10,734,719 | B1 * | 8/2020 | Bell | H01Q 1/246 |
| 11,139,644 | B2 * | 10/2021 | Klein | H02G 7/00 |
| 11,187,351 | B2 * | 11/2021 | Bell | F16L 3/06 |
| 2013/0113680 | A1 * | 5/2013 | Nemeth, III | H01Q 1/42 343/872 |
| 2016/0322697 | A1 * | 11/2016 | Skrepcinski | H01Q 1/125 |
| 2018/0053985 | A1 * | 2/2018 | Skrepcinski | H01Q 1/1228 |
| 2018/0083337 | A1 * | 3/2018 | Roy | H01Q 1/1228 |
| 2019/0055833 | A1 | 2/2019 | Jaaskelainen | |
| 2019/0123419 | A1 | 4/2019 | Pass et al. | |
| 2019/0353282 | A1 * | 11/2019 | Vaccaro | F16B 2/12 |
| 2020/0185827 | A1 | 6/2020 | Kaistha et al. | |
| 2020/0411945 | A1 * | 12/2020 | Heath | H01Q 1/12 |
| 2021/0190237 | A1 * | 6/2021 | Bell | H02G 3/263 |

* cited by examiner

ASSEMBLIES FOR REDUCING PASSIVE INTERMODULATION IN TELECOMMUNICATIONS STRUCTURES

RELATED APPLICATION(S)

The present application claims priority to and the benefit of U.S. Provisional Patent Application Ser. No. 63/079,493, filed Sep. 17, 2020, the disclosure of which is hereby incorporated herein in full.

FIELD

The present application is directed generally toward telecommunications equipment, and more particularly, methods for reducing passive intermodulation in telecommunication structures.

BACKGROUND

Traditional materials and joinery methods used in the telecommunications industry are not conducive to the creation of a passive intermodulation (PIM) isolated structure. As illustrated in FIG. 1, a telecommunications structure 10 may include a metallic antenna frame 30 having a plurality of vertical pipes 12 and a plurality of horizontal pipes 14. Typically, the vertical and horizontal pipes 12, 14 are formed from steel and are secured together via a mechanical connection 20, e.g., U-bolts, mounts, or other steel connection. The antenna frame 30 may be then secured to a mounting structure (e.g., an antenna tower) via a separate mount 15 (e.g., a pipe clamp mount). The mechanical connection 20 (e.g., U-bolts) provides a sufficient clamp load to secure the vertical and horizontal pipes 12, 14 together to form the antenna frame 30 and maintain the structural support necessary such that telecommunications equipment (e.g., antennas or radios) may be secured to the antenna frame 30.

Currently, the mechanical connections 20 within the telecommunications structure 10 (e.g., U-bolts, pipe clamp mounts, etc.) allow for vibration to be transferred freely throughout the structure 10 which can create unwanted PIM in the modern radio frequency (RF) environment. In addition, the use of metal (i.e., steel) components near an antenna on cell sites, for example, at the mechanical connection 20 points between the vertical and horizontal pipes 12, 14, can further be a source of unwanted PIM. There may be a need for mechanical connections and/or use of non-metallic materials within a telecommunication structure that reduce costs and allow for easy installation, while also alleviating technical performance concerns, such as PIM.

SUMMARY

A first aspect of the present invention is directed to a passive intermodulation reducing assembly for a telecommunications structure. The assembly includes an antenna frame including a plurality of horizontal members and a plurality of vertical members mounted on the horizontal members, wherein one or more of the vertical members is formed of a fiber-reinforced polymer, and wherein one or more of the fiber-reinforced polymer vertical members is mounted on a horizontal member via a passive intermodulation reducing member.

Another aspect of the present invention is directed to a passive intermodulation reducing assembly for a telecommunications structure. The assembly includes an antenna frame including a plurality of horizontal members and a plurality of vertical members mounted on the horizontal members, wherein one or more of the vertical members are formed of a fiber-reinforced polymer, at least one piece of telecommunications equipment mounted on one of the vertical members, and a passive intermodulation reducing member. The passive intermodulation reducing member includes a clevis having an epoxy applied on an interior surface of the clevis such that one of the fiber-reinforced polymer vertical members is secured within the clevis.

Another aspect of the present invention is direct to a passive intermodulation reducing assembly for a telecommunications structure. The assembly includes an antenna frame including a plurality of horizontal members and a plurality of vertical members mounted on the horizontal members, wherein one or more of the vertical members are formed of a fiber-reinforced polymer, at least one piece of telecommunications equipment mounted on one of the vertical members, and a passive intermodulation reducing member. The passive intermodulation reducing member includes a first clamp member having a first partial tubular section, a second clamp member having a second partial tubular section, and a polymeric sleeve sized and configured to fit around a section of a fiber-reinforced polymer vertical member, wherein the first and second partial tubular sections engage the fiber-reinforced polymer vertical member such that the polymeric sleeve resides between the vertical member and the first and second clamp members, wherein the first and second clamp members secure the vertical member to a horizontal member.

Another aspect of the present invention is directed to a passive intermodulation reducing assembly for a telecommunications structure. The assembly includes an antenna frame including a plurality of horizontal members and a plurality of vertical members mounted on the horizontal members, wherein one or more of the vertical members are formed of a fiber-reinforced polymer, at least one piece of telecommunications equipment mounted on one of the vertical members, and a passive intermodulation reducing member. The passive intermodulation reducing member includes a first clamp member having a first recess configured to engage a fiber-reinforced polymer vertical member, a second clamp member having a second recess, and a damping member configured to engage one of the horizontal members and fit within the second recess of the second clamp member, wherein the first and second clamp members secure the vertical member to the horizontal member.

Another aspect of the present invention is directed to a passive intermodulation reducing assembly for a telecommunications structure. The assembly includes an antenna frame including a plurality of horizontal members and a plurality of vertical members mounted on the horizontal members, wherein one or more of the vertical members are formed of a fiber-reinforced polymer, at least one piece of telecommunications equipment mounted on one of the vertical members, and a passive intermodulation reducing member. The passive intermodulation reducing member includes a metallic tubular member sized and configured to fit around a section of a fiber-reinforced polymer vertical member, a polymeric member residing between the metallic tubular member and the fiber-reinforced polymer vertical member, and a fastener, wherein the fastener secures the vertical member to the horizontal member.

Another aspect of the present invention is directed to a passive intermodulation reducing assembly for a telecommunications structure. The assembly includes an antenna frame including a plurality of horizontal members and a plurality of vertical members mounted on the horizontal members, wherein one or more of the vertical members are formed of a fiber-reinforced polymer, at least one piece of telecommunications equipment mounted on one of the vertical members, and a passive intermodulation reducing member. The passive intermodulation reducing member includes a horizontal member section having a clamp configured to engage a horizontal member, and a vertical member section configured to engage the horizontal member section and having a tubular section configured to engage a fiber-reinforced polymer vertical member.

Another aspect of the present invention is directed to a telecommunications structure. The telecommunications structure includes an antenna frame including a plurality of horizontal members and a plurality of vertical members mounted on the horizontal members, wherein one or more of the vertical members are formed of a fiber-reinforced polymer, and at least one piece of telecommunications equipment mounted on one of the fiber-reinforced polymer vertical members.

Another aspect of the present invention is directed to a passive intermodulation reducing assembly for a telecommunications structure. The assembly includes an antenna frame comprising a plurality of horizontal members and a plurality of vertical members mounted on the horizontal members, wherein one or more of the vertical members is formed of a fiber-reinforced polymer; at least one piece of telecommunications equipment mounted on one of the vertical members; and a passive intermodulation reducing member including a first clamping section coupled to a second clamping section, the first clamping section including an arcuate main body that defines an interior, and a pair of securing features at opposing ends of the main body that are configured to engage with each other to secure the first clamping section around the horizontal member; and the second clamping section including a first semi-circular section having securing features at each end, and a second semi-circular section having securing features at each end, wherein the securing features of the first section are configured to engage the corresponding securing features on the second section to secure the second clamping section around the vertical member, wherein the first clamping section being positioned perpendicularly to the second clamping section such that the first clamping section engages the horizontal member and the second clamping section engages the vertical member.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
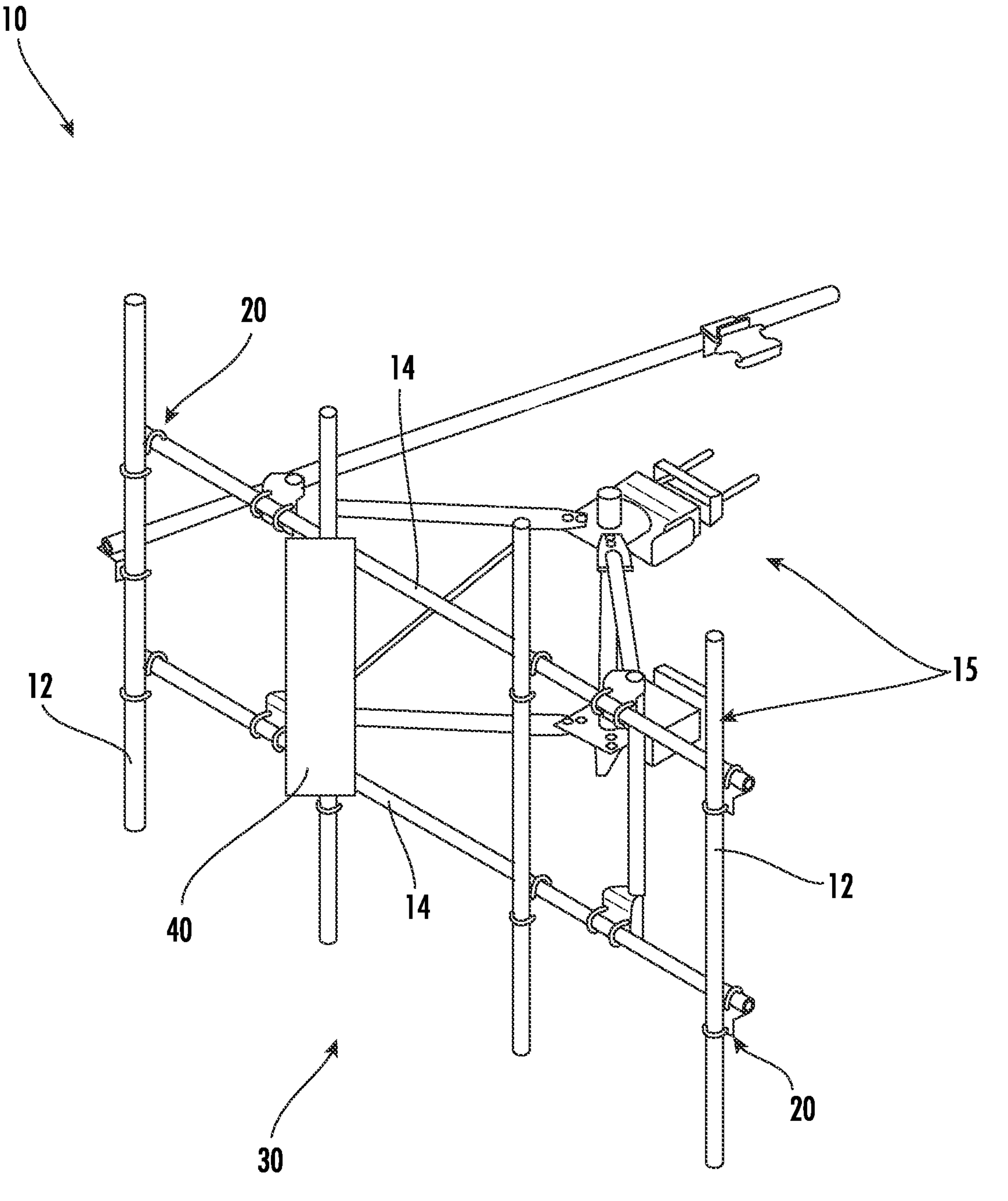
FIG. 1 (PRIOR ART)
FIG. 1 illustrates an exemplary telecommunications structure that may utilize embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown.

Like numbers refer to like elements throughout and different embodiments of like elements can be designated using a different number of superscript indicator apostrophes (e.g., 10', 10", 10''').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Embodiments of the present invention will now be discussed in greater detail with reference to FIGS. 2-15B.

Figure 2:
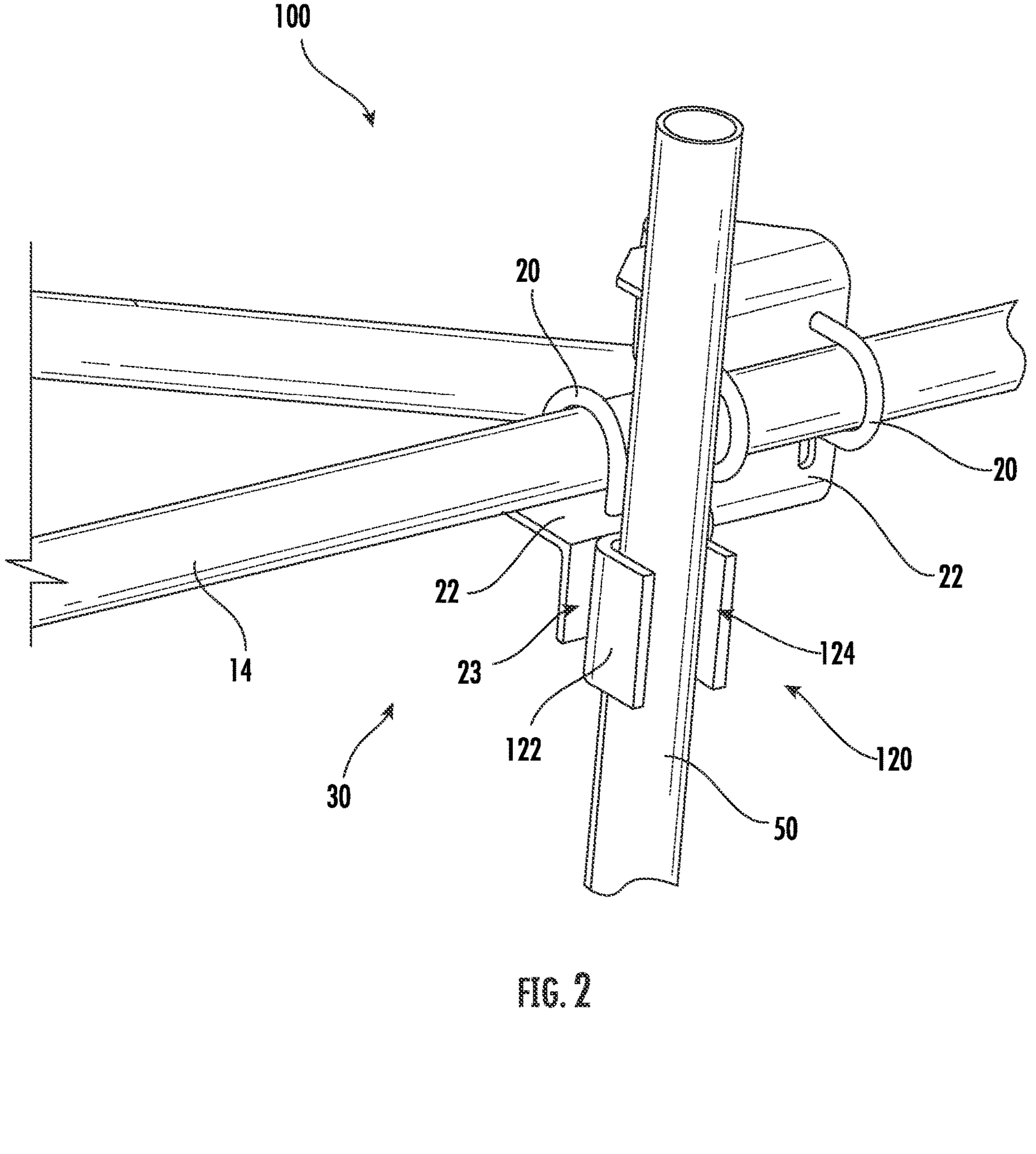
FIG. 2 is a perspective view of a passive intermodulation reducing assembly according to embodiments of the present invention.

Referring now to the drawings, a passive intermodulation reducing assembly 100 for a telecommunications structure 10 according to embodiments of the present invention is illustrated in FIG. 2. Similar to the telecommunications structure 10 shown in FIG. 1, the assembly 100 of the present invention includes an antenna frame 30 comprising a plurality of horizontal members 14 and a plurality of vertical members 12. The assembly 100 differs from the telecommunications structure 10 in that, in some embodiments, one or more of the vertical members 12 are formed of a fiber-reinforced polymer (designated at 50 in FIG. 2). A fiber-reinforced polymer or "FRP" is a composite material made of a polymer matrix reinforced with fibers. In some embodiments, the fiber-reinforced polymer that forms the one or more vertical member 50 of the present invention may comprise a polyester thermosetting plastic reinforced with a fiberglass. In some embodiments, the fiber-reinforced polymer may comprise a "sandwich" composite or structure in which an open- or closed-cell-structured foam may be used as the core material (or middle layer) and fiber-reinforced polymers may be used to form the outer layers (i.e., the foam is sandwiched between the fiber-reinforced polymers). A variety of known materials may be used as the core material, for example, polystyrene foams, polyurethane, polyethylene, balsa wood, and aramid.

In some embodiments, the fiber-reinforced polymer vertical member 50 may be solid or hollow (i.e., tubular). In some embodiments, the fiber-reinforced polymer vertical member 50 may be formed by an extrusion process. In some embodiments, the fiber-reinforced polymer vertical member 50 is configured such that telecommunications equipment (e.g., an antenna or radio) may be mounted thereto. As shown in FIG. 2, the cross-sectional shape of the vertical member 50 may be circular; however, other cross-sectional geometries may be used, for example, square, oval, triangular, cruciform or hexagonal.

In some embodiments, utilizing one or more fiber-reinforced polymer vertical members 50 in the telecommunications structure 10 may provide for a telecommunications structure 10 that is overall lighter in weight and cheaper to install. In addition, reducing the number of metallic (i.e., steel) components in and around the telecommunications structure 10 may help to improve the technical performance of the cell site by mitigating or eliminating sources of unwanted PIM.

Still referring to FIG. 2, in some embodiments, the one or more fiber-reinforced polymer vertical members 50 may be mounted on (or secured to) a horizontal member 14 via a passive intermodulation reducing member 120. As shown in FIG. 2, in some embodiments, the passive intermodulation reducing member 120 may comprise a clevis 122 (or U-shaped member). In some embodiments, the clevis 122 may be secured to a mount 22 (e.g., via bolts) which is secured to the horizontal member 14 by a fastener 20 (e.g., a U-bolt). In some embodiments, the clevis 122 may be secured directly to the horizontal member 14.

In some embodiments, an epoxy (or thermosetting polymer) 124 may be applied to an interior surface of the clevis 122. The fiber-reinforced polymer vertical member 50 may then be secured (held) within the clevis 122 by the epoxy 124, and thus, secured to the horizontal member 14. An epoxy 124 should be chosen that provides adequate mechanical resistance to meet the structural requirements of the assembly 100. In some embodiments, the epoxy (or thermosetting polymer) 124 may be a two-part epoxy that has sufficient resistance to harsh environmental conditions (e.g., rain, snow, etc.). The epoxy 124 allows the vertical member 50 to be secured to the horizontal member 14 without applying a clamp load, thereby mitigating, or eliminating the potential of damaging the fiber-reinforced polymer vertical member 50.

In some embodiments, at least one piece of telecommunications equipment 40 may be mounted on one or more of the fiber-reinforced polymer vertical members 50 (see, e.g., FIG. 1).

Figure 3A:
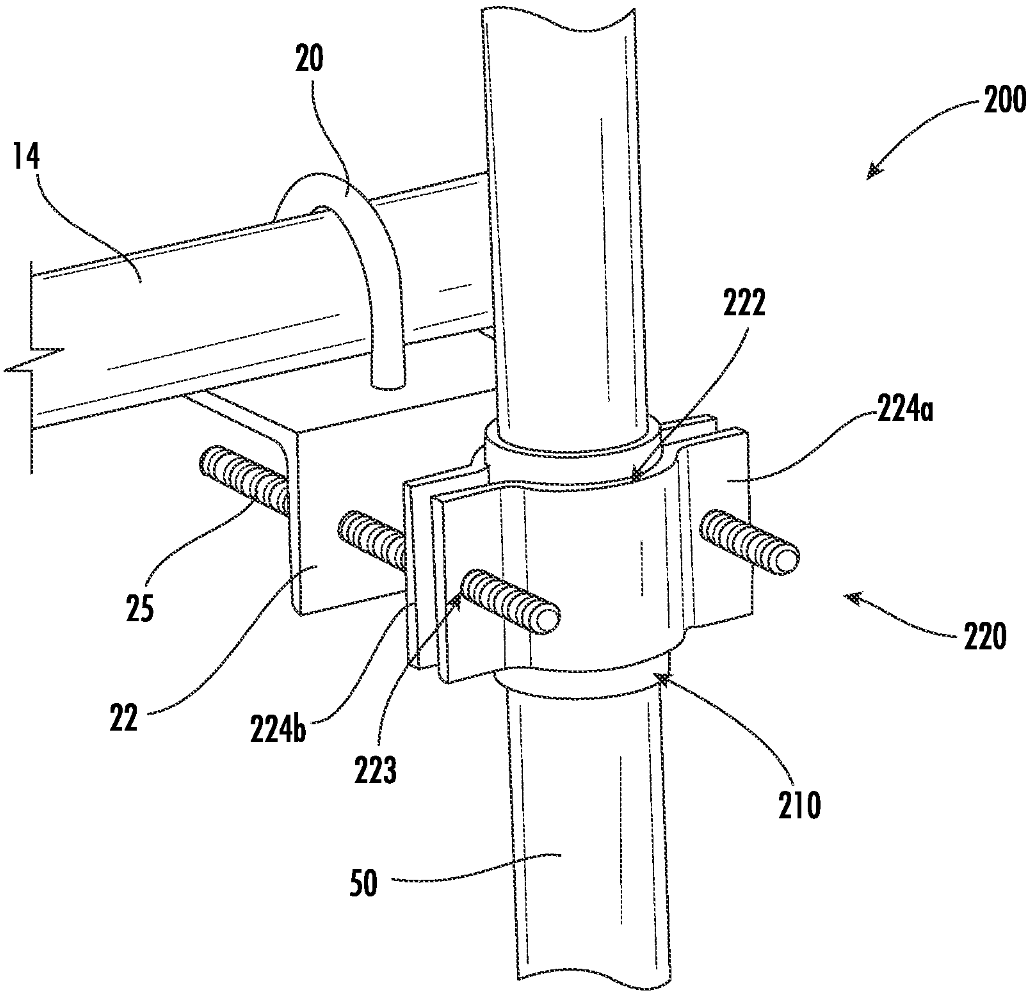
FIG. 3A is a perspective view of another passive intermodulation reducing assembly according to embodiments of the present invention.
Figure 3B:
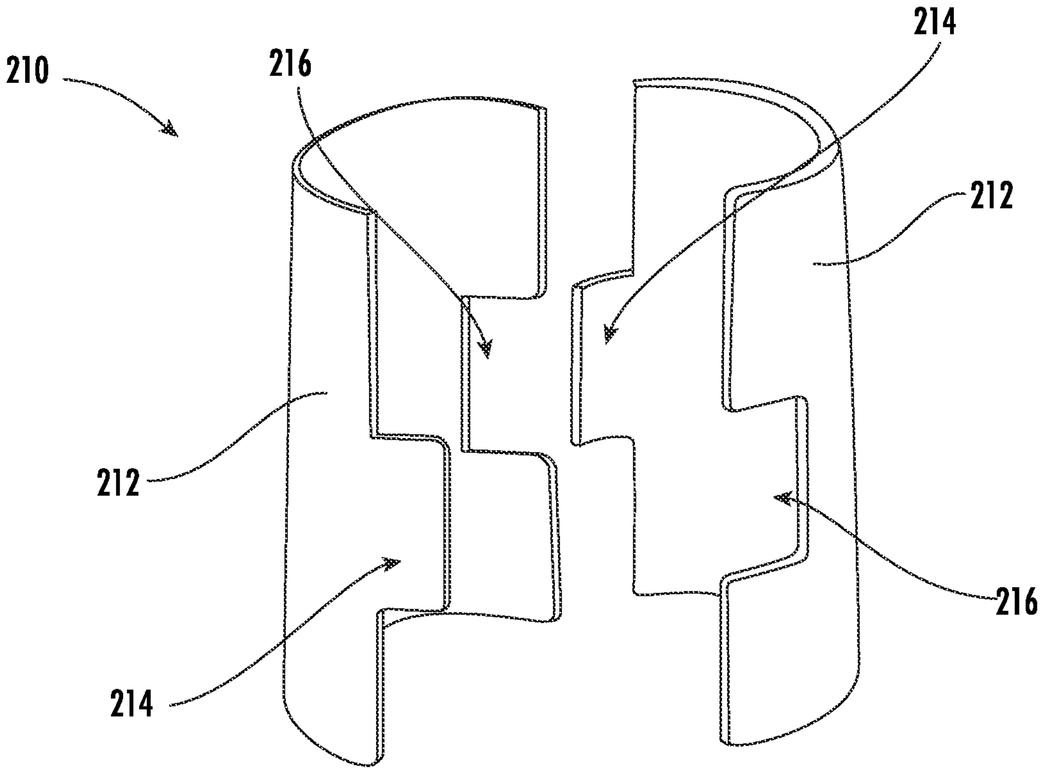
FIG. 3B is a perspective view of an exemplary polymeric sleeve of the passive intermodulation reducing assembly of FIG. 3A.

Referring now to FIGS. 3A-3B, another passive intermodulation reducing assembly 200 according to embodiments of the present invention is illustrated. The assembly 200 includes an alternative passive intermodulation reducing member 220. As shown in FIG. 3A, the passive intermodulation reducing member 220 may include a first clamp member 224*a* and a second clamp member 224*b*. Each of the clamp members 224*a*, 224*b* may have a partial tubular section (or recessed section) 222. The partial tubular section 222 of each clamp member 224*a*, 224*b* may be sized and configured to receive a portion of the fiber-reinforced polymer vertical member 50.

In some embodiments, the passive intermodulation reducing member 220 may further include a polymeric sleeve 210 (see also FIG. 3B). The polymeric sleeve 210 is sized and configured to fit around a section of a fiber-reinforced polymer vertical member 50. In some embodiments, the polymeric sleeve 210 may be formed from polycarbonate, polyurethane, polyamide, or acetal.

As shown in FIG. 3A, the partial tubular sections 222 of the first and second clamp members 224*a*, 224*b* are sized and configured to engage the fiber-reinforced polymer vertical member 50. In some embodiments, the clamp members 224*a*, 224*b* may be configured to prevent over-tightening (e.g., by geometric design or by placing spacers between the clamp members 224*a*, 224*b*). Similar to the clevis 122 of the passive intermodulation reducing member 120 described herein, in some embodiments, the clamp members 224*a*, 224*b* of the passive intermodulation reducing member 220 may be configured to be secured to a mount 22 which is secured to the horizontal member 14 by a fastener 20 (e.g., a U-bolt), thereby securing the vertical member 50 to the horizontal member 14. In some embodiments, the clamp members 224*a*, 224*b* may be secured to the mount 22 via threaded bolts 25.

In some embodiments, the polymeric sleeve 210 resides between the vertical member 50 and the clamp members 224*a*, 224*b*. The polymeric sleeve 210 helps to protect the vertical member 50 from being damaged by the clamp members 224*a*, 224*b* when a clamp load is being applied (e.g., the threaded bolts are being tightened). The polymeric sleeve 210 also may assist in damping within the assembly 200. In addition, the clamp members 224*a*, 224*b* may be configured to help spread the clamp load on the vertical member 50 compared to applying a localized clamp load, for example, when a U-bolt is used (see, e.g., FIG. 1).

An exemplary polymeric sleeve 210 that may be used with the passive intermodulation reducing member 220 is illustrated in FIG. 3B. As shown in FIG. 3B, in some embodiments, the polymeric sleeve 210 may comprise two segments 212. Each segment 212 may have an arcuate shape that corresponds to the outer surface of the vertical member 50 and is configured to cooperate with another segment 212 to engage the fiber-reinforced polymer vertical member 50. For example, in some embodiments, each segment 212 may comprise one or more tongues (or protrusions) 214 and grooves (or recesses) 216. The corresponding grooves 216 and tongues 214 are configured to interlock when the two segments 212 are engaged with the fiber-reinforced polymer vertical member 50.

Figure 4A:
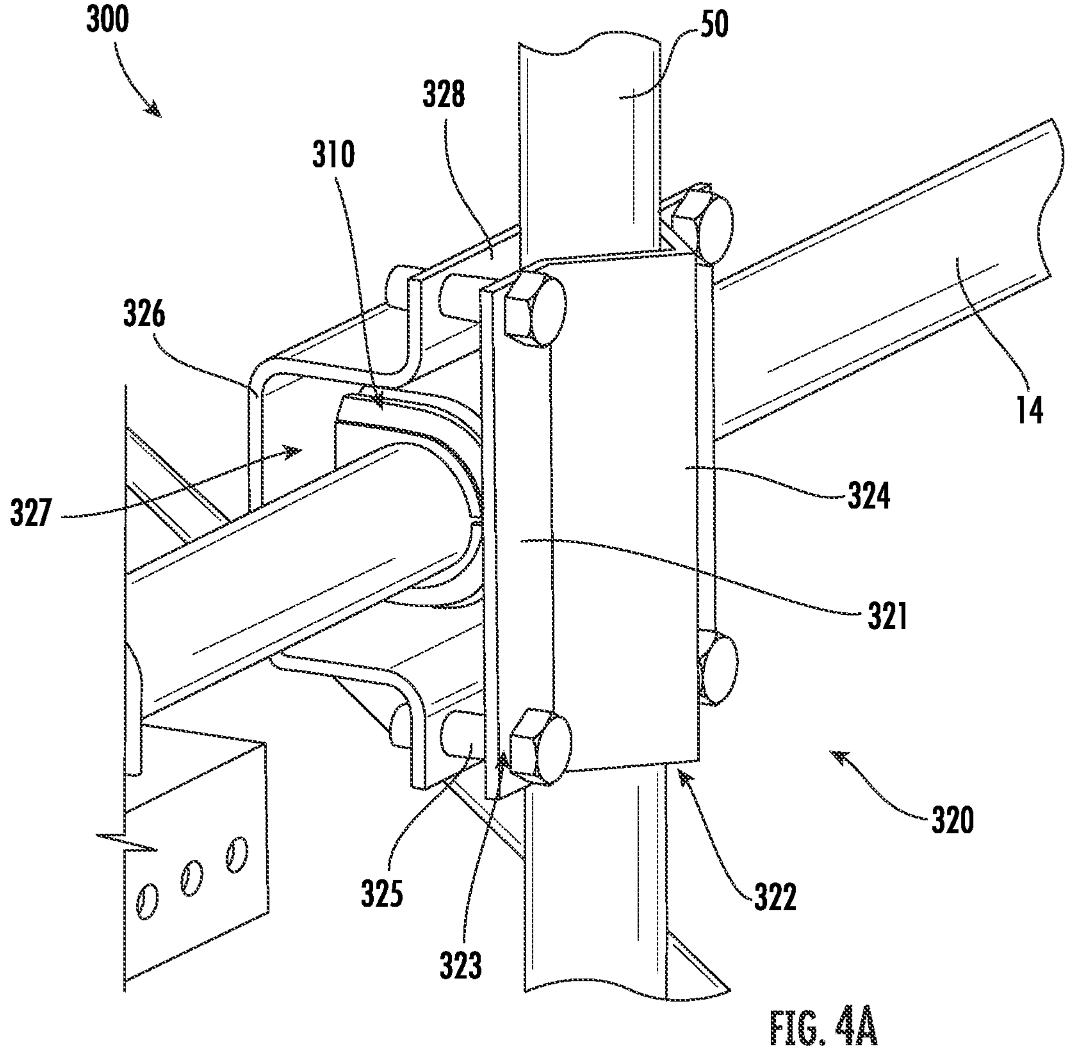
FIG. 4A is a perspective view of another passive intermodulation reducing assembly according to embodiments of the present invention.
Figure 4B:
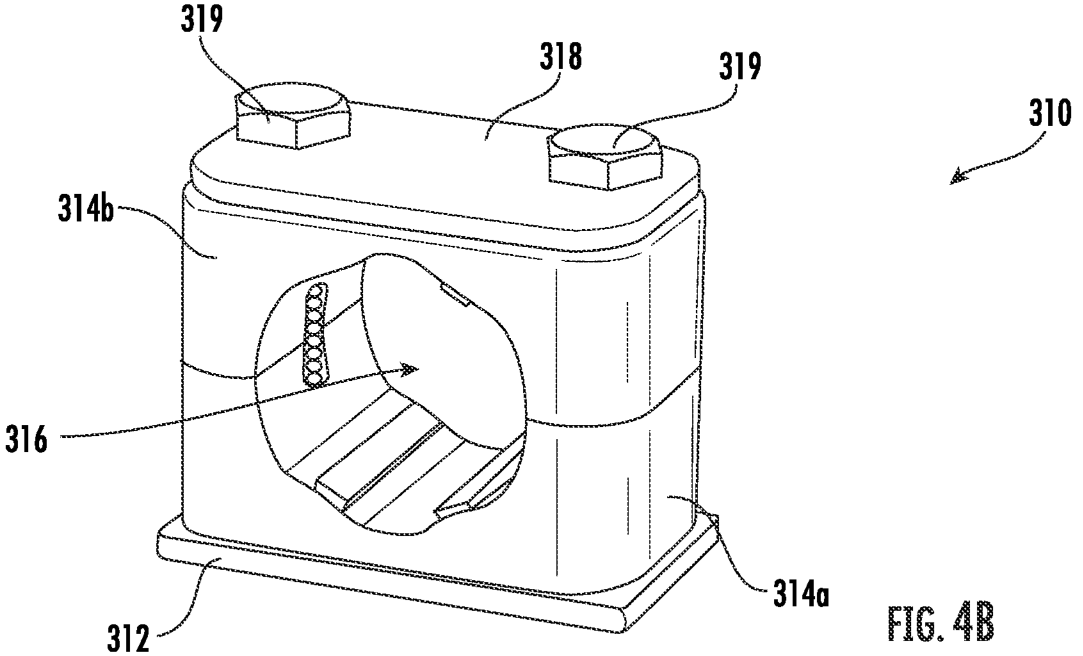
FIG. 4B is a perspective view of an exemplary damping member of the passive intermodulation assembly of FIG. 4A.

Referring now to FIGS. 4A-4B, another passive intermodulation reducing assembly 300 according to embodiments of the present invention is illustrated. The assembly 300 includes an alternative passive intermodulation reducing member 320. As shown in FIG. 4A, the passive intermodulation reducing member 320 includes two clamp members 324, 326. The first clamp member 324 has a recessed section 322 between two flanged ends 321. The recessed section 322 is sized and configured to engage (or receive) the fiber-reinforced polymer vertical member 50. Each flanged end 321 of the first clamp member 324 includes one or more apertures 323 sized to receive a bolt 325. As shown in FIG. 4A, in some embodiments, the recessed section 322 may be triangular in shape. In other embodiments, the recessed section 322 may be partially tubular in shape.

The second clamp member 326 also has a recessed section 327 and a pair of flanged ends 328. The flanged ends 328 of the second clamp member 324 also include one or more apertures 323 that are configured to align with the apertures 323 of the first clamp member 324 and are sized to receive a bolt 325 such that the second clamp member 326 may be secured to the first clamp member 324.

In some embodiments, the passive intermodulation reducing member 320 further includes a damping member 310. The damping member 310 fits within the recessed section 327 of the second clamp member 326 and is configured to engage one of the horizontal members 14. In some embodiments, the damping member 310 may be coupled to the second clamp member 326 within the recessed section 327. In some embodiments, the damping member 310 may comprise a polymeric material and assists in damping within the passive intermodulation reducing assembly 300.

As shown in FIG. 4A, the first and second clamp members 324, 326 are secured together via bolts 325 extending through apertures 323 such that the vertical member 50 and the horizontal member 14 reside between the clamp members 324, 326. The clamp members 324, 326 may be configured to help spread the clamp load on the vertical member 50 (e.g., from the tightening of the bolts 325). In some embodiments, the clamp members 324, 326 may be configured to prevent over-tightening. For example, in some embodiments, the geometry of the recessed section 322 of the first clamp member 324, as well as the damping member 310 within the recessed section 327 of the second clamp member 326, may help to protect the vertical member 50 from being damaged when a clamp load is being applied. In some embodiments, spacers (not shown) may be placed between the clamp members 324, 326 to further help prevent the vertical member 50 from being damaged from the clamp load.

FIG. 4B illustrates an exemplary damping member 310 that may be used in the passive intermodulation reducing assembly 300. As shown in FIG. 4B, in some embodiments, the damping member 310 may include two segments 314*a*, 314*b*. In some embodiments, each segment 314*a*, 314*b* may be formed from a polymeric material. For example, in some embodiments, the segments 314*a*, 314*b* may be formed from polycarbonate, polyurethane, or acetal. Other known damping plastics may be used. Each segment 314*a*, 314*b* has a partial tubular section 316. The partial tubular sections 316 are sized and configured to engage the horizontal member 14. In some embodiments, the damping member 310 may further include a top plate 318 and a bottom plate 312. Each plate 312, 318 may be coupled to a respective segment 314*a*, 314*b* to provide structural support to the damping member 310. Once both segments 314*a*, 314*b* are engaged with the horizontal member 14, the segments 314*a*, 314*b* may be secured together by bolts 319 extending through each segment 314*a*, 314*b* and corresponding plate 312, 318. In some embodiments, the damping member 310 may comprise a U-bolt (or fastener) 20 that is configured to secure the segments 314*a*, 314*b* in an engaged position around the horizontal member 14. The U-bolt 20 may be secured to the second clamp member 326 within the recessed section 327.

Figure 5:
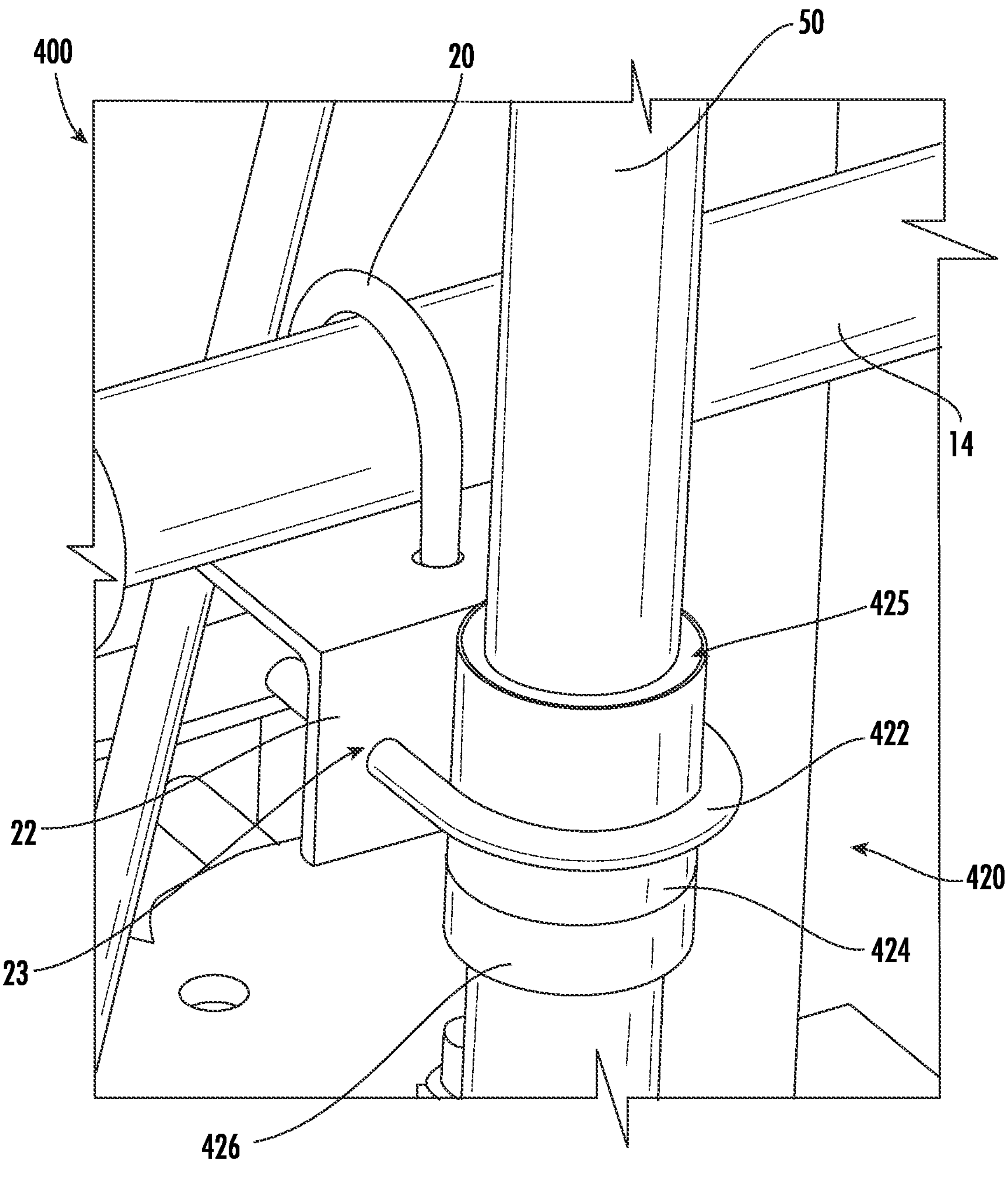
FIG. 5 is a perspective view of another passive intermodulation reducing assembly according to embodiments of the present invention.

Referring now to FIG. 5, another passive intermodulation reducing assembly 400 according to embodiments of the present invention is illustrated. The assembly 400 includes an alternative passive intermodulation reducing member 420. As shown in FIG. 5, in some embodiments, the passive intermodulation reducing member 420 includes a metallic tubular member 424. The metallic tubular member 424 is sized and configured to fit around a section of the fiber-reinforced polymer vertical member 50. In some embodiments, the passive intermodulation reducing member 420 further includes a polymeric member 426 that resides between the metallic tubular member 424 and the vertical member 50. In some embodiments, the polymeric member 426 is polyurethane foam. In some embodiments, the polyurethane foam fills a void space 425 between the metallic tubular member 424 and the vertical member 50 such that the polyurethane foam (i.e., polymeric member 426) secures and holds the vertical member 50 within the metallic tubular member 424.

The passive intermodulation reducing member 420 further includes a fastener 422 configured to secure the metallic tubular member 424 (and secured vertical member 50) to a horizontal member 14. As shown in FIG. 5, in some embodiments, the fastener 422 may be a U-bolt that may be secured around the metallic tubular member 424. Similar to other passive intermodulation reducing members 120, 220 described herein, in some embodiments, the fastener 422 of the passive intermodulation reducing member 420 may be configured to be secured to a mount 22 which is secured to the horizontal member 14 by another fastener 20 (e.g., a U-bolt). As shown in FIG. 5, the mount 22 may comprise apertures 23 sized to receive the fastener 422. The fastener 422 is positioned around the metallic tubular member 424 to secure the vertical member 50 to the horizontal member 14.

The polymeric member 426 may help to protect the vertical member 50 from being damaged when a clamp load is being applied (e.g., tightening of the U-bolt fastener 422). In addition, the polymeric member 426 may provide some damping within the passive intermodulation reducing assembly 400.

Figure 6A:
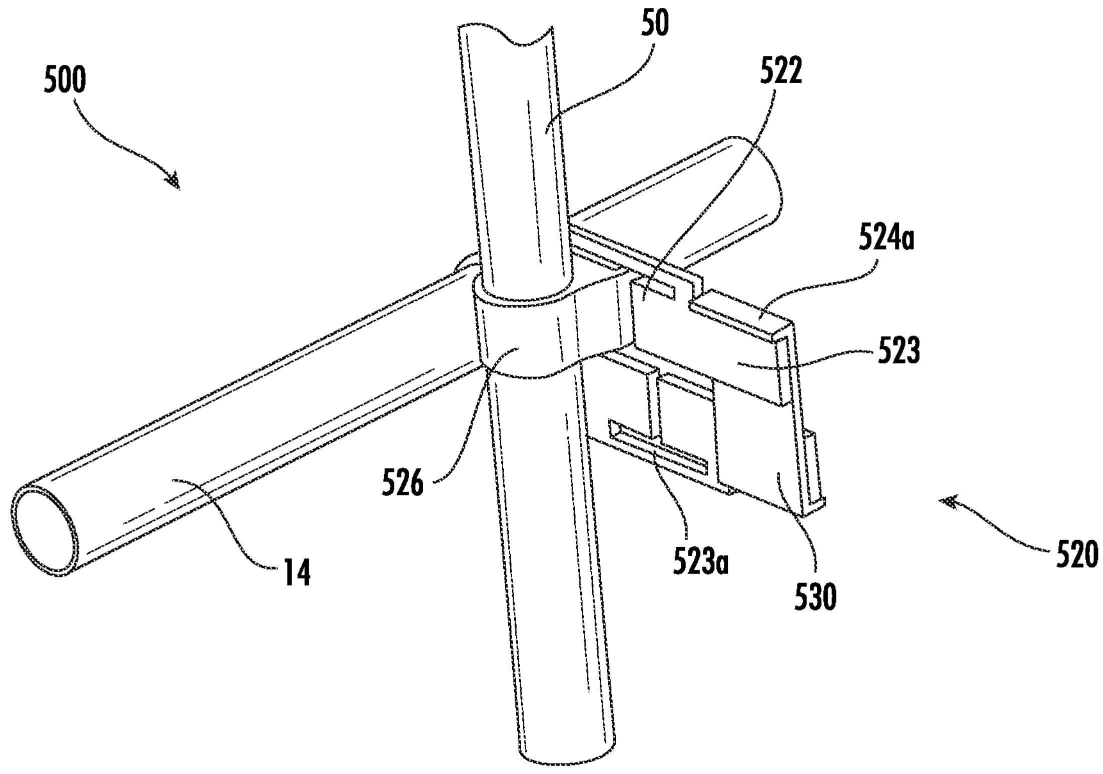
FIG. 6A is a front perspective view of another passive intermodulation reducing assembly according to embodiments of the present invention.
Figure 6B:
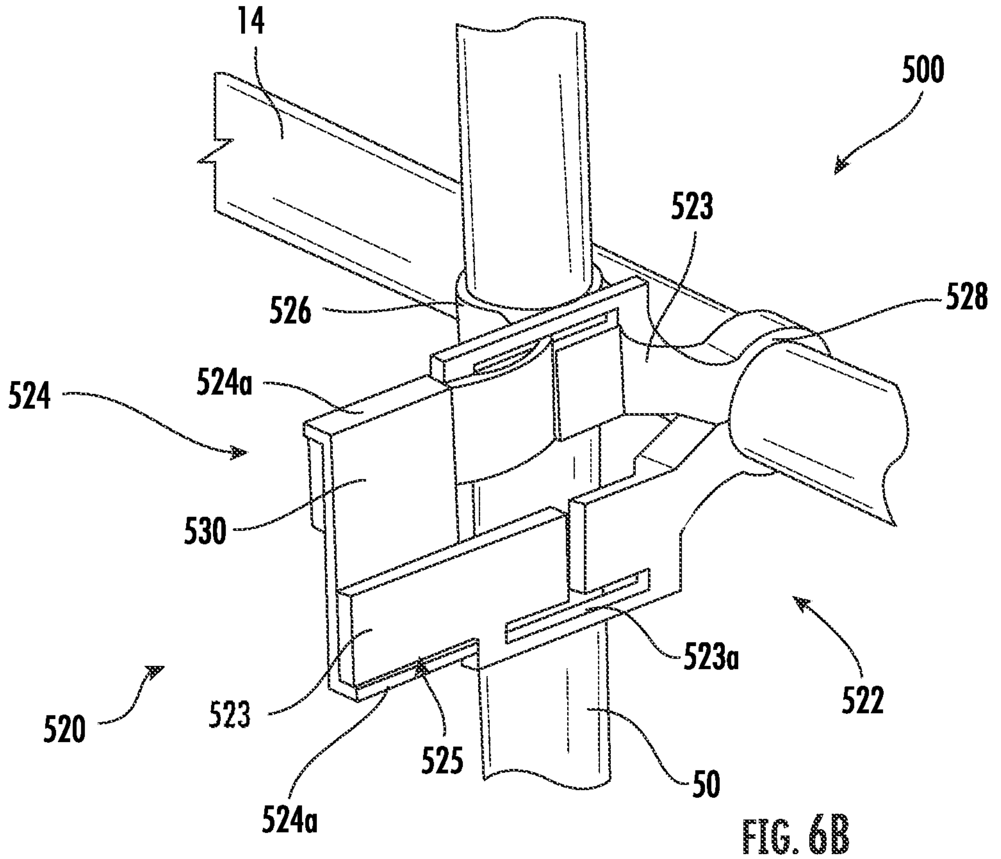
FIG. 6B is a rear perspective view of the passive intermodulation reducing assembly of FIG. 6A.
Figure 6C:
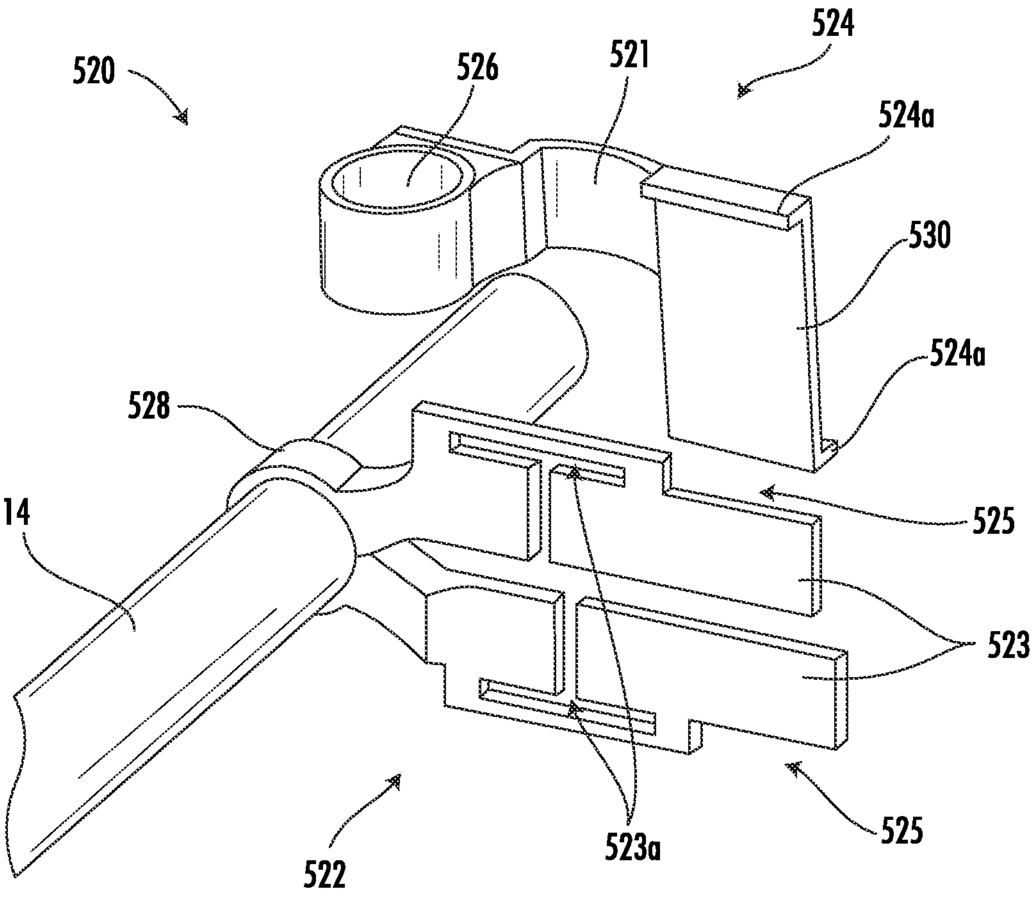
FIG. 6C is an exploded view of the passive intermodulation reducing assembly of FIGS. 6A-6B.

Referring now to FIGS. 6A-7D, another passive intermodulation reducing assembly 500 according to embodiments of the present invention is illustrated. The assembly 500 includes an alternative passive intermodulation reducing member 520. As shown in FIGS. 6A-6C, the passive intermodulation reducing member 520 includes two sections: a horizontal member section 522 and a vertical member section 524. In some embodiments, the vertical member section 524 may be configured to engage (and become interlocked) with the horizontal member section 522. In some embodiments, the horizontal member section 522 is configured to engage (and be secured to) a horizontal member 14 of the antenna frame 30. Similarly, in some embodiments, the vertical member section 524 is configured to engage (and be secured to) a fiber-reinforced vertical member 50 of the antenna frame 30. Thus, in some embodiments, when engage and secured together, the horizontal member section 522 and vertical member section 524 (i.e., passive intermodulation reducing member 520) may be configured to secure a fiber-reinforced polymer vertical member 50 to the horizontal member 14.

In some embodiments, the horizontal member section 522 and vertical member section 524 may be formed from a polymeric material. For example, in some embodiments, the horizontal member section 522 and vertical member section 524 may be formed from acrylonitrile butadiene styrene (ABS), nylon, or polyphenylene oxide. In some embodiments, the horizontal and vertical member sections 522, 524 may be formed from a glass-filled plastic formed from a molding operation. In some embodiments, the horizontal member section 522 and vertical member section 524 may be formed as two separate members. In some embodiments, the horizontal member section 522 and vertical member section 524 may be formed as a unitary member.

In some embodiments, the horizontal member section 522 includes a clamp 528 sized and configured to engage the horizontal member 14. In some embodiments, the horizontal member section 522 includes a pair of arms 523 extending outwardly from the clamp 528. In some embodiments, the horizontal member section 522 may be secured to the horizontal member 14 by inserting the horizontal member 14 through the clamp 528 and sliding the horizontal member section 522 onto the horizontal member 14 to a desired location on the horizontal member 14. In some embodiments, the polymeric material that forms the horizontal member section 522 gives the arms 523 (and clamp 528) of the horizontal member 522 a certain degree of flexibility and resilience such that the arms 523 may be pulled or stretched radially outwardly to allow the horizontal member 14 to engage the clamp 528. After the horizontal member 14 is engaged within the clamp 528, the resilient nature of the polymeric material allows the arms 523 of the horizontal member section 522 to recover to its original position, thereby securing the horizontal member 14 within the clamp 528 of the horizontal member section 522.

Figure 7A:
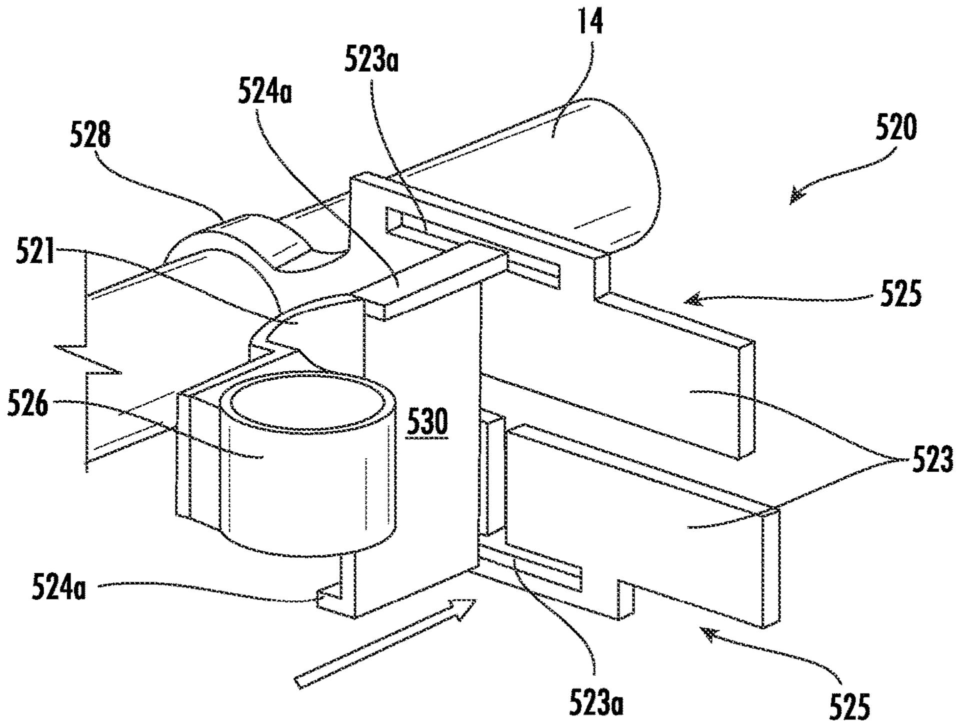
FIGS. 7A-7D illustrate the assembly of the passive intermodulation reducing assembly of FIGS. 6A-6C.
Figure 7B:
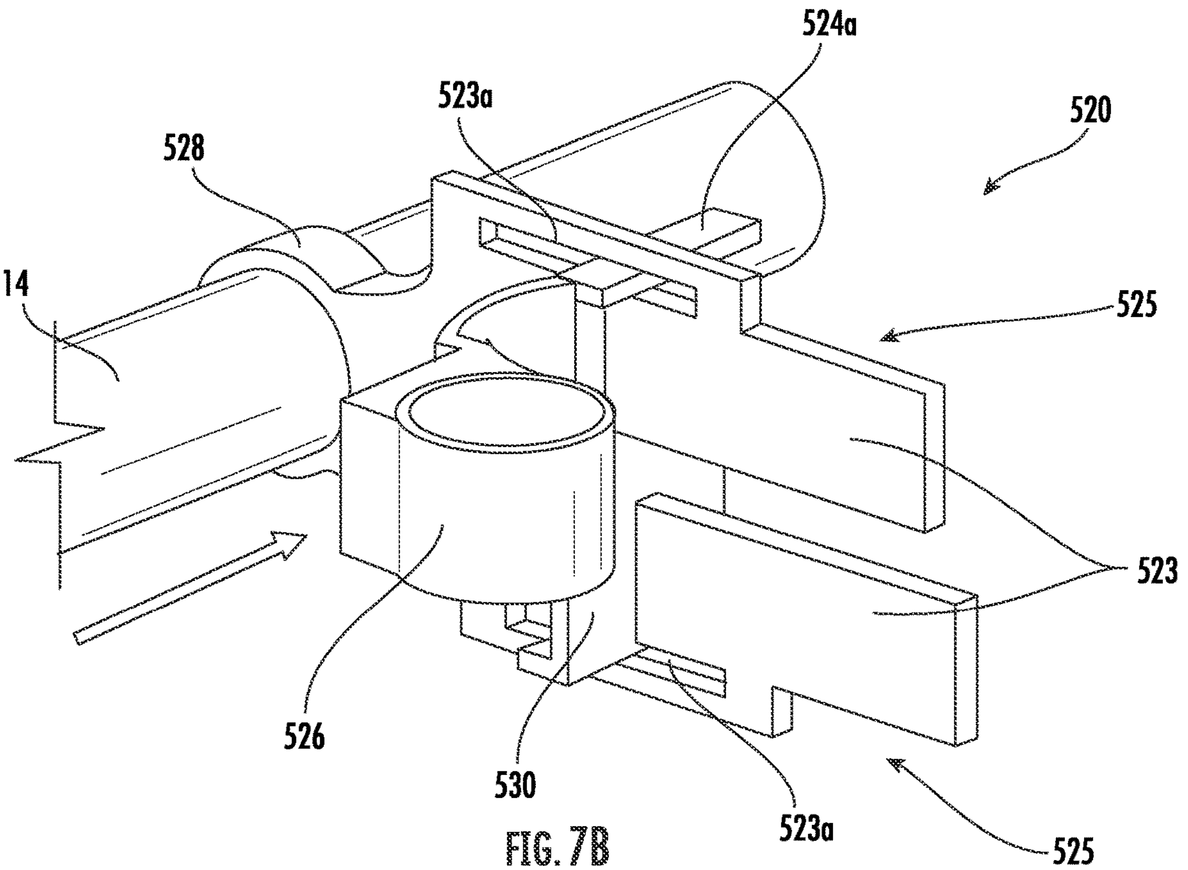
Figure 7C:
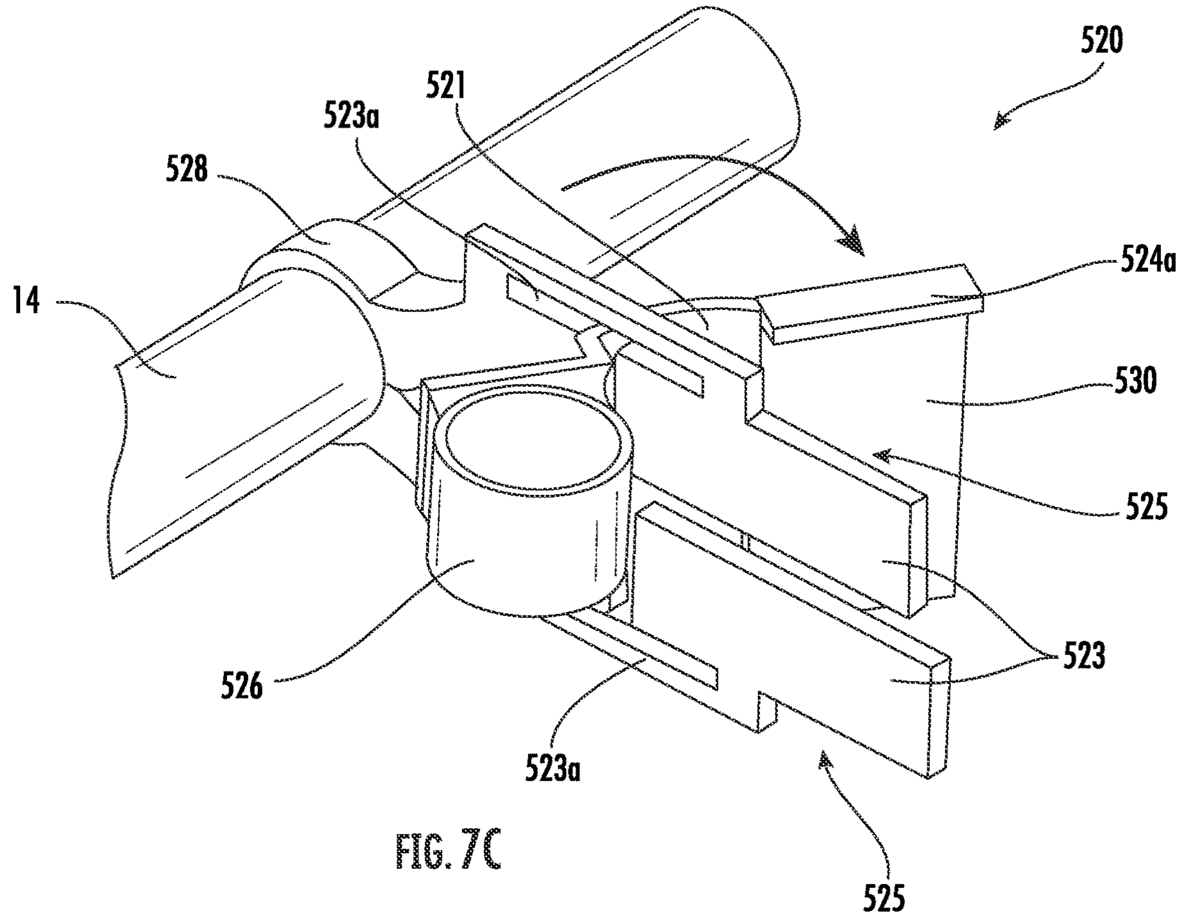
Figure 7D:
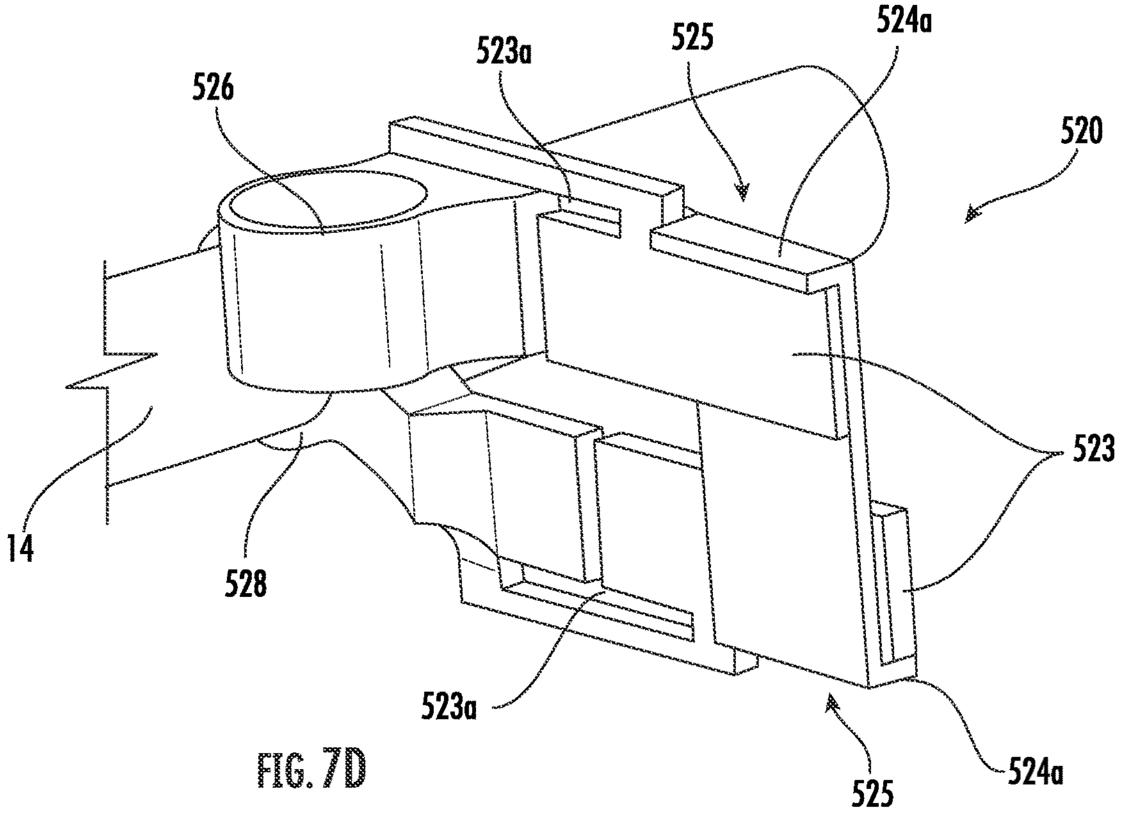

Referring to FIGS. 7A-7D, once the horizontal member section 522 is secured with the horizontal member 14, the vertical member section 524 may be engaged with the horizontal member section 522 such that a fiber-reinforced polymer vertical member 50 may be secured to the horizontal member 14 (i.e., via the passive intermodulation reducing member 520). For example, in some embodiments, the arms 523 of the horizontal member section 522 may each comprise a slot 523*a* configured to receive an interlocking portion 530 of the vertical member section 524. In some embodiments, the slots 523*a* may be "T" shaped. As shown in FIGS. 7A-7B, the interlocking portion 530 is inserted through the slots 523*a* of the horizontal member 522 until an arcuate portion 521 of the vertical member section 524 extends through one of the slots 523*a*. As shown in FIG. 7C, the vertical member section 524 may then be pivoted (i.e., within the arcuate portion 521) to engage the arms 523 of the horizontal member 522. For example, in some embodiments, the interlocking portion 530 of the vertical member section 524 may have a pair of flanges 524*a* that extend radially outwardly in opposing directions. The flexibility and resilience of the polymeric material that forms the horizontal and vertical member sections 522, 524 allows the arms 523 and the flanges 524*a* to be maneuvered to engage an edge (or recess) 525 of the horizontal member section 522 (FIG. 7D), thereby securing the vertical member section 524 (and fiber-reinforced vertical member 50) to the horizontal member section 522 (and horizontal member 14).

In some embodiments, the vertical member section 524 of the passive intermodulation reducing member 520 includes a tubular section 526. The tubular section 526 is sized and configured to fit around and engage the fiber-reinforced polymer vertical member 50. In some embodiments, the vertical member 50 may be inserted and slid through the tubular section 526, thereby securing the vertical member 50 within the tubular section 526 of the vertical member section 524. In some embodiments, the tubular section 526 of the vertical member section 524 forms an interference fit with the vertical member 50. Thus, the vertical member 50 can be secured to the horizontal member 14 via the passive intermodulation reducing member 520 (i.e., when the vertical member section 524 engages with the horizontal member section 522).

Figure 8:
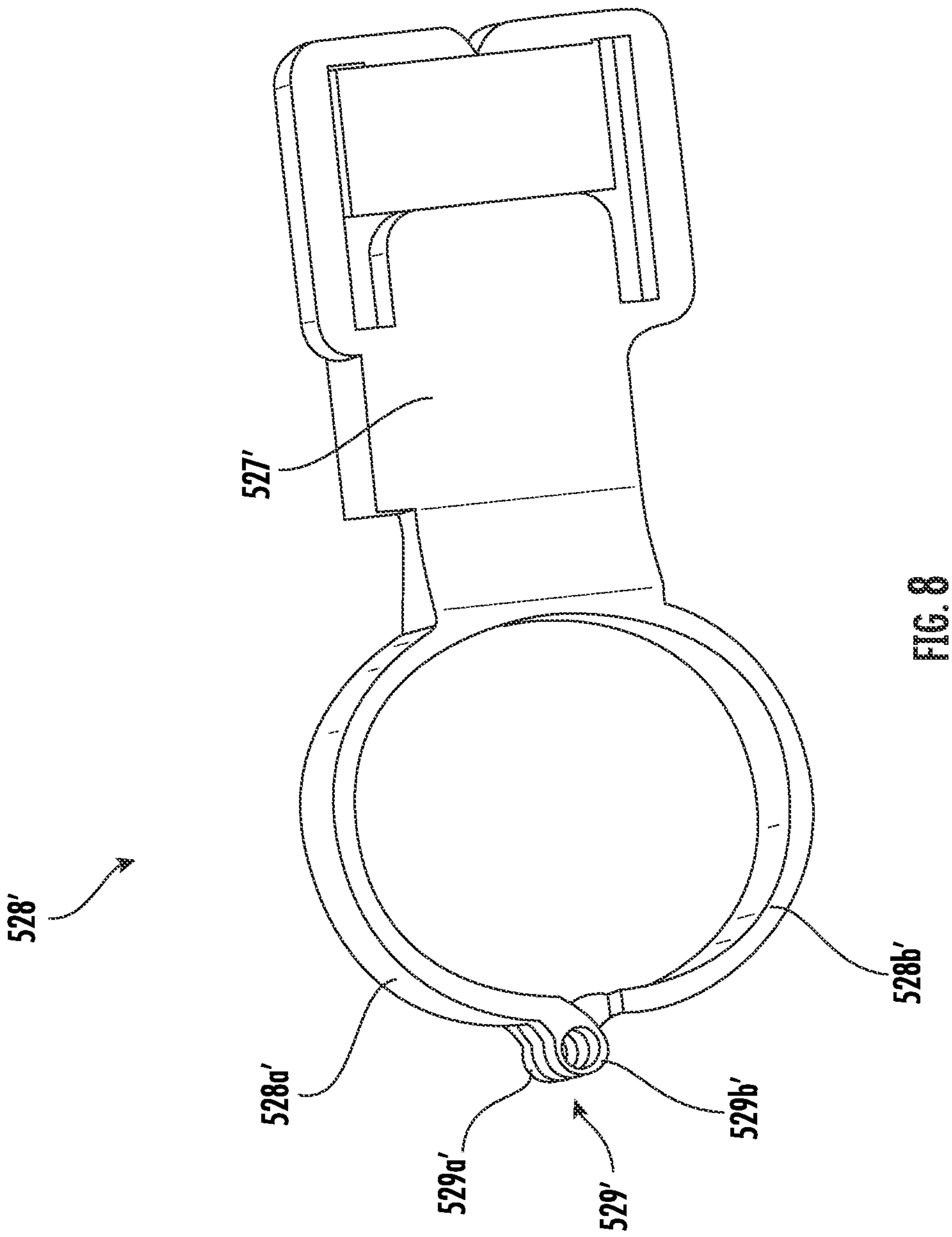
FIG. 8 is an alternative clamp having a pinned connection for the passive intermodulation reducing assembly of FIGS. 6A-6C.

As shown in FIG. 8, in some embodiments, the passive intermodulation reducing member 520 may further comprise an alternative separate clamp section 528'. In some embodiments, the clamp section 528', the horizontal member section 522, and vertical member section 524 may be formed as a unitary member. The clamp section 528' may comprise a main body 527' configured to engage and lock with a modified horizontal member section 522. A pair of arcuate arms **528*a*', 528*b*' are coupled to the main body 527' and are configured to engage and secure a horizontal member 14 there between. In some embodiments, the arms 528*a*', 528*b*' may have at least one pin hole 529*a*', 529*b*' residing at the end of each arm 528*a*', 528*b*'. When the arms 528*a*', 528*b*' are in a closed position (e.g., as shown in FIG. 8) the pin holes 529*a*', 529*b*' align to form a pinned connection 529'. A pin or other locking mechanism (e.g., a bolt or screw) (not shown) may be inserted through the pin connection 529' to secure the arms 528*a*', 528*b*' of the clamp section 528' together, for example, around a horizontal member 14**.

Figure 9:
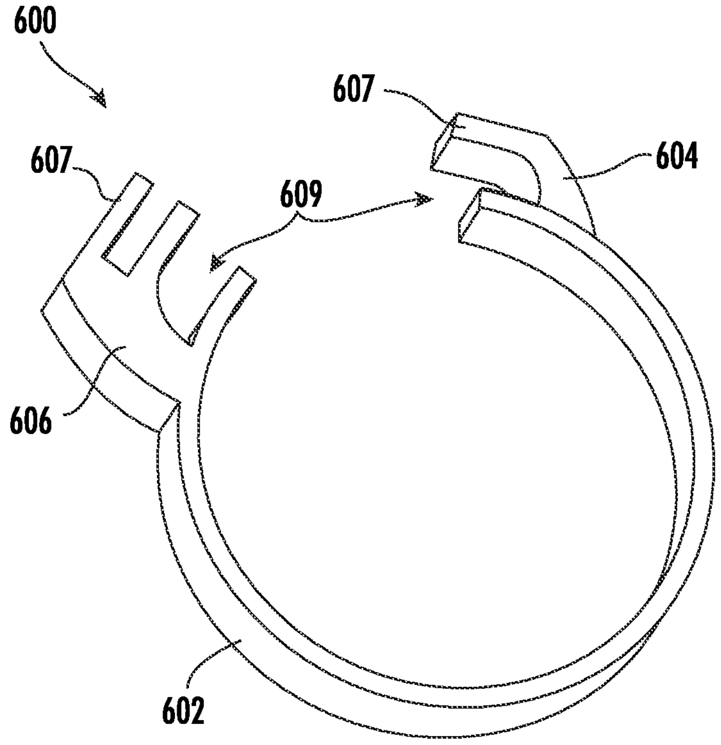
FIG. 9 is a perspective view of an alternative clamping mechanism according to embodiments of the present invention.

Referring now to FIG. 9, a clamping mechanism 600 according to embodiments of the present invention is illustrated. The clamping mechanism 600 may be incorporated into one or more of the assemblies 100, 200, 300, 400, 500 described herein to secure a fiber-reinforced polymer vertical member 50 to a horizontal member 14. As shown in FIG. 9, the clamping mechanism 600 may comprise an arcuate body 602 sized and configured to be secured around the vertical member 50. In some embodiments, opposing ends 604, 606 of the arcuate body 602 may be configured to engage and become locked together. For example, in some embodiments, each end 604, 606 of the arcuate body 602 comprise one or more 607 tabs and corresponding recesses 609.

In some embodiments, the clamping mechanism 600 may provide torque control which allows for a user to apply a predictable clamp load on the fiber-reinforced polymer vertical member 50 when the member 50 is being secured within the clamping mechanism 600. For example, in some embodiments, the tabs 607 of the clamping mechanism 600 may be configured to align and become secured within the corresponding recesses 609 when the proper torque is being applied to the clamping mechanism 600. In some embodiments, each opposing end 604, 606 of the arcuate body 602 may have indices that indicate to an installer when a sufficient clamp load is being applied (e.g., holes that become aligned). The installer could then secure the clamping mechanism 600 to another structure (e.g., a horizontal member 14) at the indicated clamp load. In some embodiments, more than one clamping mechanism 600 may be used to secure the fiber-reinforced polymer vertical member 50 to the antenna frame 30 of the telecommunications structure 10.

Figure 10:
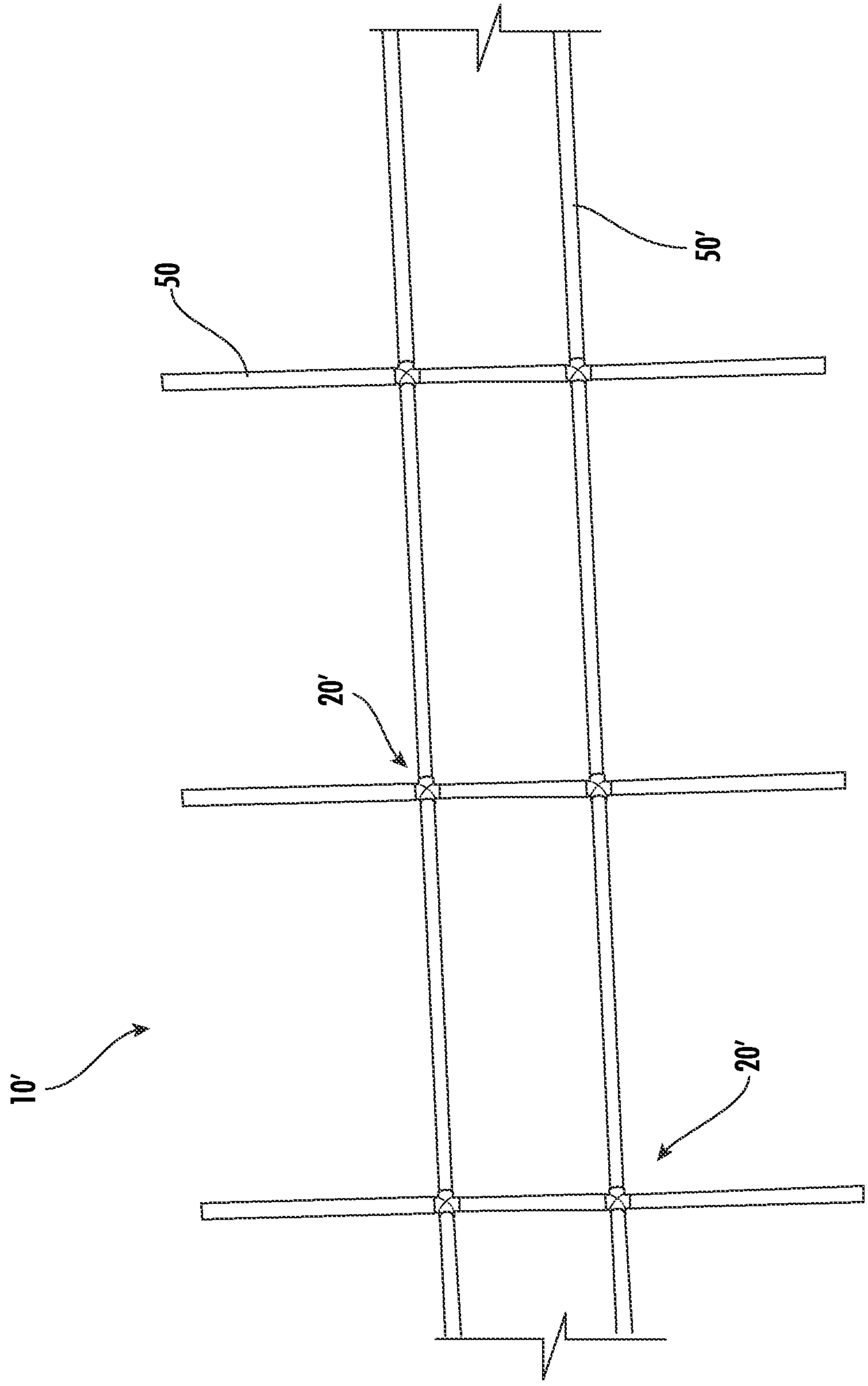
FIG. 10 is a perspective view of a telecommunications structure according to embodiments of the present invention.

Referring to FIG. 10, a telecommunications structure 10' according to embodiments of the present invention may include vertical members 50 and horizontal members 50' formed from fiber-reinforced polymers. The mechanical connections 20' securing the fiber-reinforced polymer vertical members 50 to the fiber-reinforced polymer horizontal members 50' may utilize any of the passive intermodulation reducing members 120, 220, 320, 420, 520 described herein.

Figure 11:
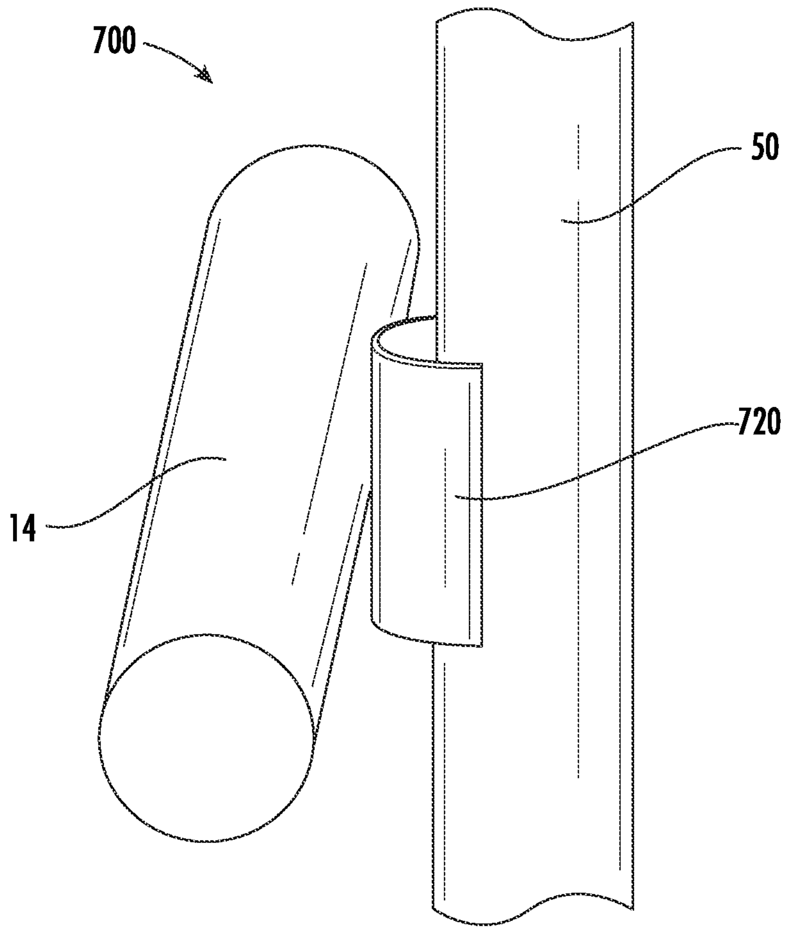
FIG. 11 is a perspective view of another passive intermodulation reducing assembly according to embodiments of the present invention.
Figure 12A:
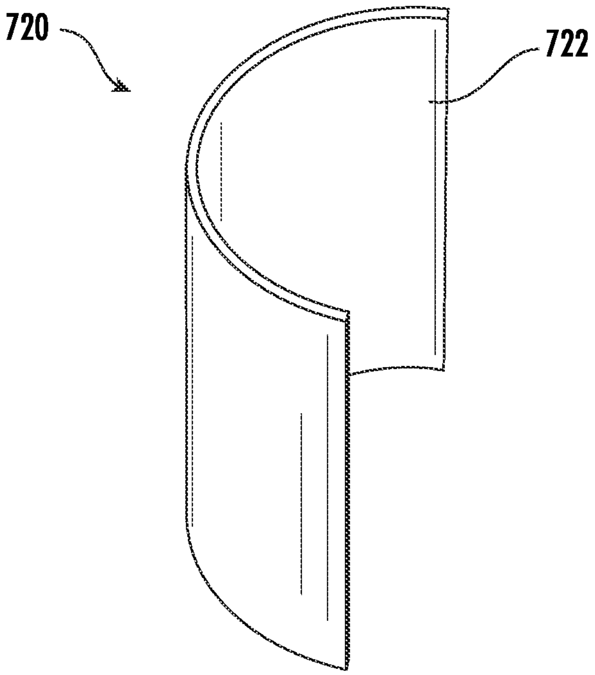
FIG. 12A is a perspective view of an isolator sleeve of the passive intermodulation reducing assembly of FIG. 11.
Figure 12B:
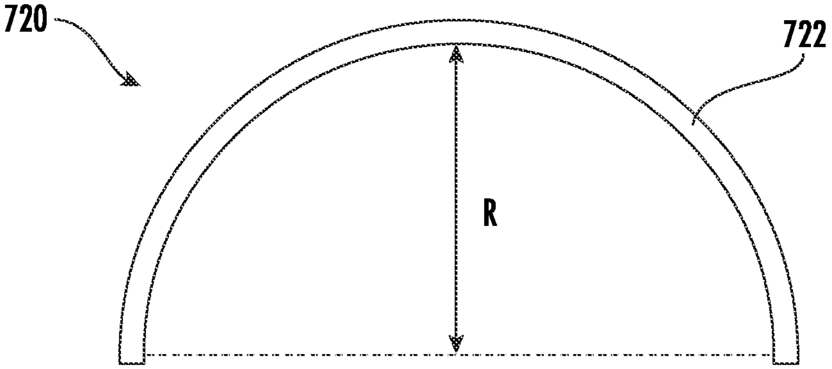
FIG. 12B is a top view of the isolator sleeve of FIG. 12A.

Referring now to FIG. 11, another passive intermodulation reducing assembly 700 according to embodiments of the present invention is illustrated. The assembly 700 includes an isolator barrier 720 (see also FIGS. 12A-12B). The isolator barrier 720 may be a half-cylinder, full cylinder, or something therebetween (e.g., a third of a cylinder). In some embodiments, the isolator barrier 720 may be formed of a metallic material and coated with a non-metallic PIM-free coating, such as acetal (polyoxymethylene), polypropylene, acrylonitrile butadiene styrene, polyamide, acrylonitrile styrene acrylate, and polycarbonate. In some embodiments, the isolator barrier 720 may be formed of a non-metallic material (e.g., plastic or ceramic). In some embodiments, the isolator barrier 720 may be formed of a combination metallic and non-metallic materials. As shown in FIGS. 12A-12B, the isolator barrier 720 has an arcuate (i.e., semi-circular, or half-cylinder) main body 722. In some embodiments, the main body 722 of the isolator barrier 720 has a radius R that corresponds to the outer diameter of the vertical pipe 50. This allows the isolator barrier 720 to fit snuggly against the vertical member 50 (e.g., forms an interference fit or snaps into place). In some embodiments, the isolator barrier 720 may have a slightly smaller radius R than the outer diameter of the vertical pipe 50 such that the isolator barrier 720 may be bent into place to grip the vertical member 50. As shown in FIG. 11, the isolator barrier 720 resides between a respective horizontal member 14 and vertical member 50, thereby eliminating metal-to-metal contact between the horizontal and vertical members 14, 50 and reducing PIM.

Figure 13:
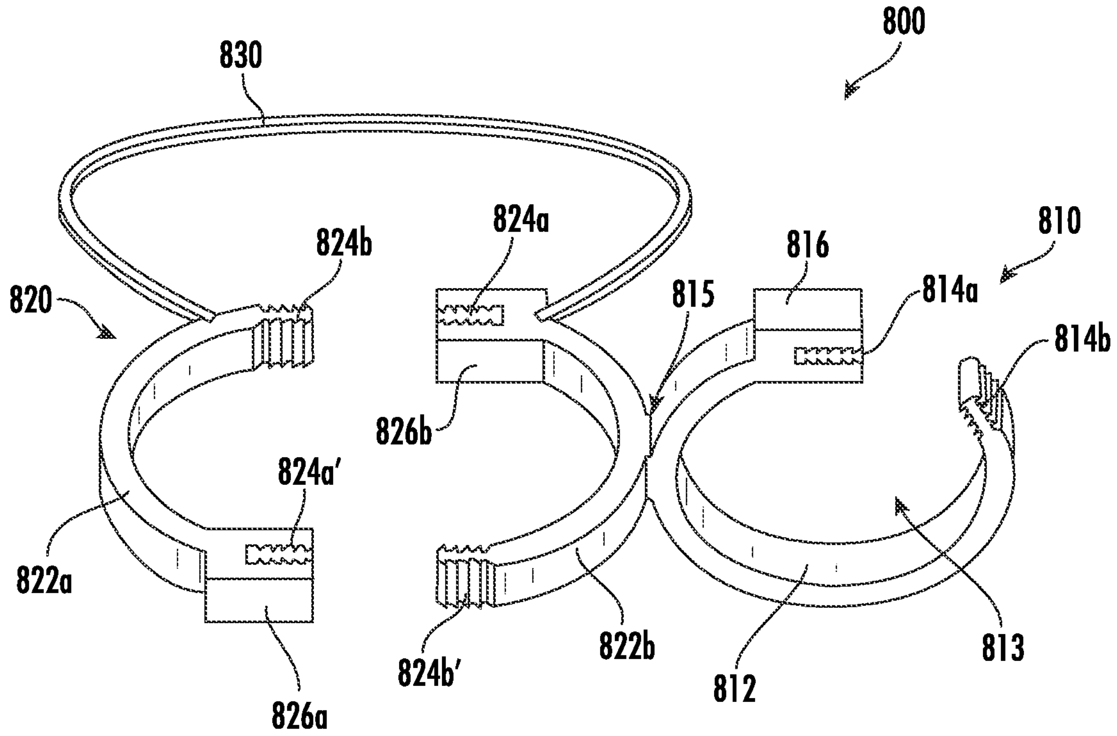
FIG. 13 is a perspective view of an alternative clamping mechanism according to embodiments of the present invention.

Referring now to FIG. 13, an alternative clamping mechanism 800 according to embodiments of the present invention is illustrated. The clamping mechanism 800 may be incorporated into one or more of the assemblies described herein to secure a fiber-reinforced polymer vertical member 50 to a horizontal member 14 (see, e.g., passive intermodulation reducing assembly 900 illustrated in FIGS. 14A-14B), or could be used to join (and maintain separation between) two metal poles. The clamping mechanism 800 may be formed of a variety of materials, but is typically formed of a polymeric material, and therefore may be suitable for use in any location near the antenna without creating PIM.

As shown in FIG. 13, the clamping mechanism 800 includes a first clamping section 810 coupled to or integral with a second clamping section 820. In some embodiments, the first clamping section 810 may be sized and configured to be secured around a horizontal member 14 and the second clamping section 820 may be sized and configured to be secured around a vertical member 50 or vice versa (see, e.g., FIGS. 14A-14B). Thus, as shown in FIG. 13 (and FIGS. 14A-14B), in some embodiments, the first clamping section 810 is positioned perpendicular to the second clamping section 820. In other embodiments, the first clamping section 810 may be sized and configured to be secured around a vertical member 50 and the second clamping section 820 may be sized and configured to be secured around a horizontal member 14.

The first clamping section 810 has an arcuate main body 812 that defines an interior 813. The interior 813 is sized to receive a horizontal member 14 (i.e., sized to receive the outer diameter of the respective horizontal member 14). The main body 812 comprises corresponding securing features **814*a*, 814*b* at opposing ends. The securing features 814*a*, 814*b* are configured to engage with each other to secure the first clamping section 810 around a horizontal member 14. For example, in some embodiments, the securing features 814*a*, 814*b* may comprise a toothed projection 814*b* on one end and a toothed receptacle 814*a* at the opposite end. The toothed projection 814*b* and toothed receptacle 814*a* are arranged such that the projection 814*b* is positioned to engage the receptacle 814***a*, and when compressed together, the horizontal member 14 (or vertical member 50) may be secured within the interior 813 of the first clamping section 810. The teeth of the projection 814*b* may be configured to permit "one-way" movement (i.e., a "ratcheting" movement), such that the projection 814*b* can be drawn deeper into the receptacle 814*a*, but cannot easily be drawn away from the receptacle 814*a*.

In some embodiments, at least one of the ends of the main body 812 of the first clamping section 810 may further include a shoulder 816. The shoulder 816 may provide a location for a technician to grip the first clamping section 810 and compress the securing features 814*a*, 814*b* together, for example, with a pair of pliers. The shoulder 816 may also provide additional structural support to the securing features 814*a*, 814*b* (and first clamping section 810) when interlocked together.

Figure 14A:
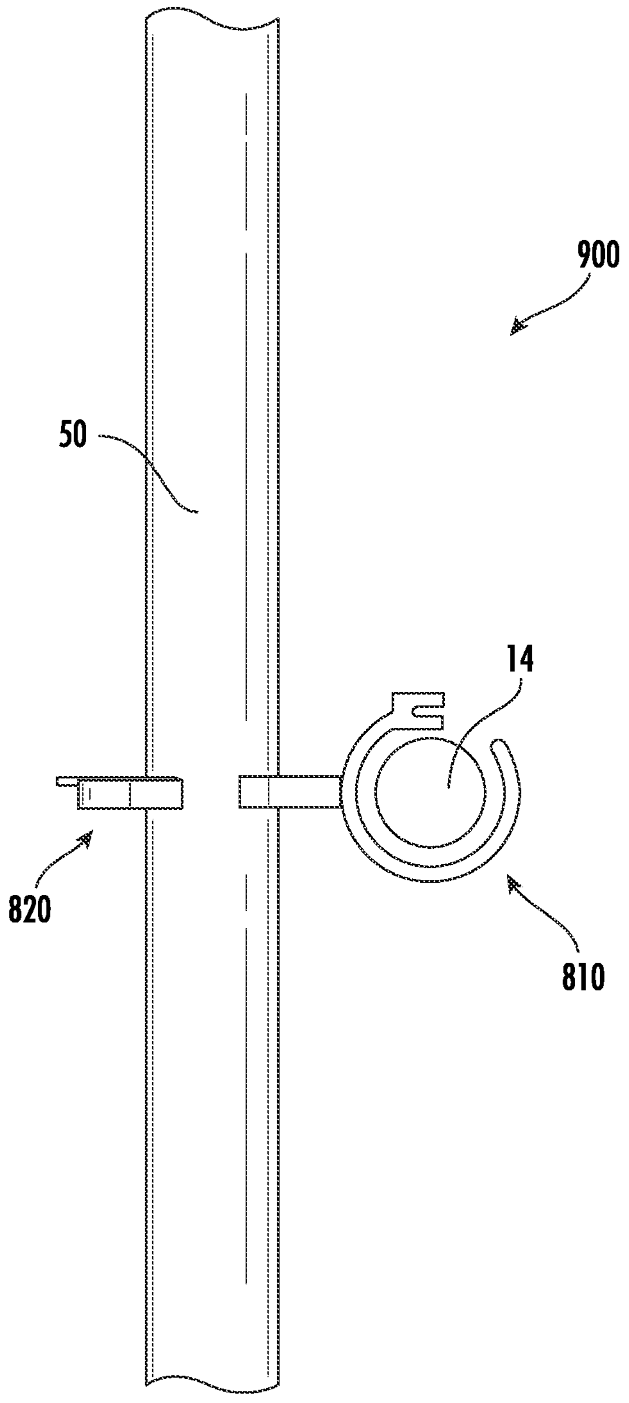
FIG. 14A is a side view of a passive intermodulation reducing assembly utilizing the clamping mechanism of FIG. 13 according to embodiments of the present invention.
Figure 14B:
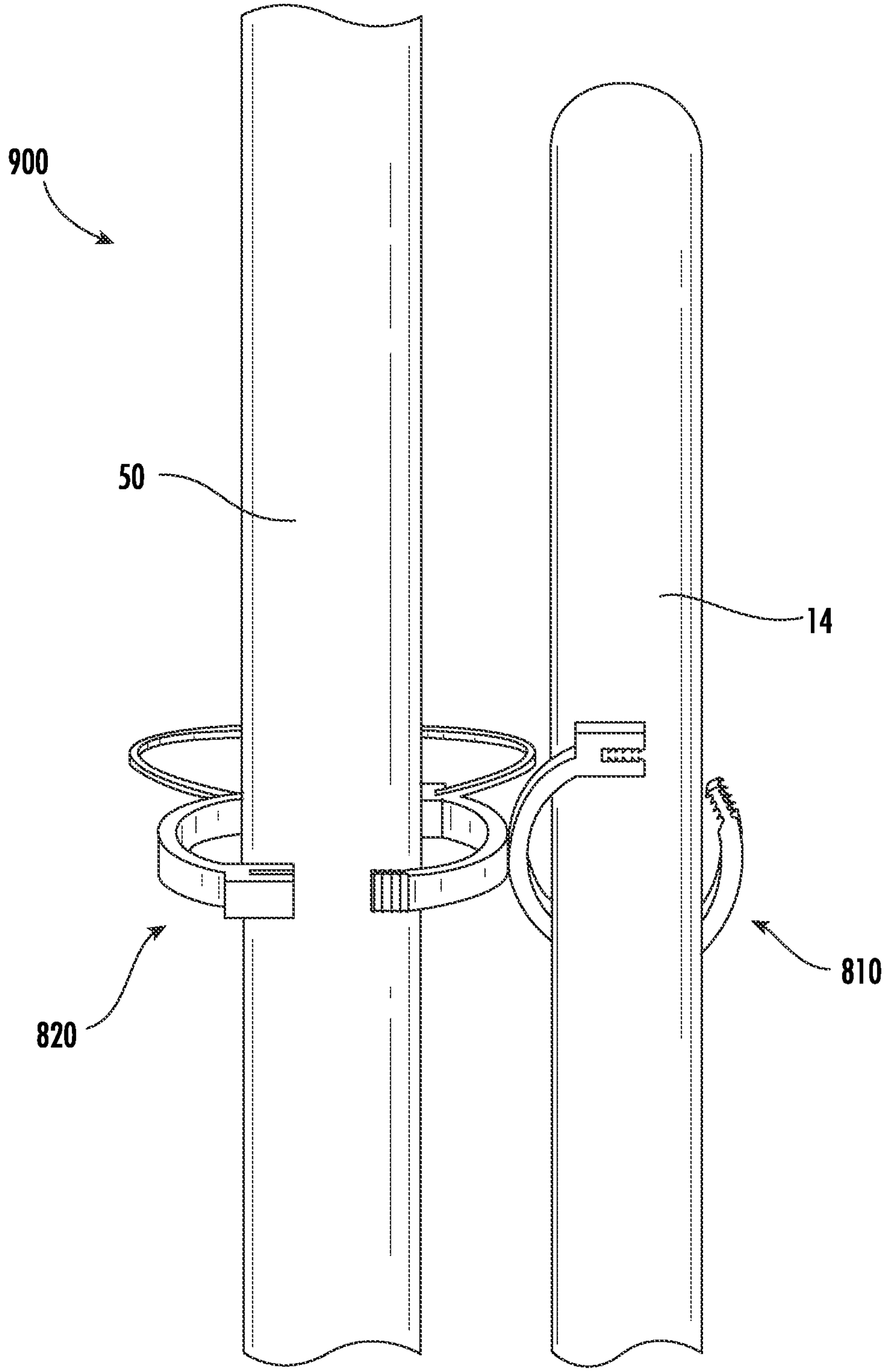
FIG. 14B is a perspective view of the passive intermodulation reducing assembly of FIG. 14A.

Still referring to FIG. 13, the second clamping section 820 includes two (first and second) semi-circular sections 822*a*, 822*b* that are configured to engage together around a vertical member 50 (see, e.g., FIGS. 14A-14B). Similar to the first clamping section 810, each semi-circular section 822*a*, 822*b* comprises securing features 824*a*, 824*b*, 824*a*', 824*b*' that are configured to engage a corresponding securing feature 824*a*, 824*b*, 824*a*', 824*b*' on the other section 822*a*, 822*b*. For example, similar to the first clamping section 810, in some embodiments, the securing features 824*a*, 824*b*, 824*a*', 824*b*' may comprise toothed projections 824*b*, 824*b*' and toothed receptacles 824*a*, 824*a*'. The semi-circular sections 822*a*, 822*b* are arranged such that the toothed projections 824*b*, 824*b*' are positioned to engage (interlock) with the corresponding toothed receptacles 824*a*, 824*a*'. When the corresponding securing features 824*a*, 824*b*, 824*a*', 824*b*' (e.g., interlocking teeth) are respectively compressed together, the second clamping section 820 becomes secured to the vertical member 50 (or horizontal member 14) (see, e.g., FIGS. 14A-14B).

In some embodiments, the first and second sections 822*a*, 822*b* may be coupled together via a flexible tether 830 or the like. The tether 830 is attached at one end of each of the semi-circular sections 822*a*, 822*b*. The tether 830 should be of sufficient length to allow the sections 822*a*, 822*b* to be easily handled and manipulated individually.

In use, the clamping mechanism 800 can be positioned such that the sections 822*a*, 822*b* are on opposite sides of a vertical member 50 (or horizontal member 14) to be grasped, and oriented such that the projections 824*b*, 824*b*' align with, respectively, the receptacles 824*a*, 824*a*'. The sections 822*a*, 822*b* can then be brought together so that the projection 824*b* is received in the receptacle 824*a* and the projection 824*b*' is received in the receptacle 824*a*', thereby forming a ring with the sections 822*a*, 822*b* around the vertical member 50 (or horizontal member 14). Next, a horizontal member 14 (or vertical member 50) is positioned within the interior 813 of the first clamping section 810 and the projections 814*b* are aligned with the receptacle 814*a*. The ends of the clamping section 810 can then be brought together so that the projection 814*b* is received in the receptacle 814*a*, thereby forming a ring around the horizontal member 14 (or vertical member 50). Similar to the first clamping section 810, the teeth of the projections 824*b*, 824*b*' and the receptacles 824*a*, 824*a*' may be configured so that they permit "one-way" relative movement.

Those of skill in this art will appreciate that the clamping mechanism 800 may be modified. Although each of the projection 814*b*, 824*b*, 824*b*' and receptacle 814*a*, 824*a*, 824*a*' of the clamping mechanism 800 is shown with teeth on two opposed surfaces, in some embodiments, the teeth may be located on only one surface of each of the projections and receptacles. In another example, the clamping mechanism 800 may have two features that function as both projection and receptacle (e.g., jaws). Also, in some embodiments, the receptacle may have a bore therethrough, such that the projection can be pulled through the entire receptacle and project from the opposite end (somewhat akin to a "zip tie" style of band fastener). Other configurations of mating fastening features (e.g., a "split boss" that latches into a round bore or holes that serves as a receptacle) may also be employed. In addition, the first and second clamping sections 810, 820 may include cushions or other features to further enhance the grip on a respective horizontal and/or vertical member 14, 50 when secured within the respective clamping section 810, 820.

In addition, in some embodiments, at least one of the ends of each of the semi-circular sections 822*a*, 822*b* of the second clamping section 820 may further comprise a shoulder 826*a*, 826*b*. Similar to the shoulder 816 of the first clamping section 810, each shoulder 826*a*, 826*b* may provide a location for a technician to grip the sections 822*a*, 822*b* and compress the corresponding securing features 824*a*, 824*b*, 824*a*', 824*b*' together. The shoulder 826*a*, 826*b* may also provide additional structural support to the securing features 824*a*, 824*b*, 824*a*', 824*b*' (and second clamping section 820) when interlocked together.

In other embodiments, both clamping sections 810, 820 of the clamping mechanism 800 may be configured similar to the first clamping section 810 described herein (i.e., each clamping section having an arcuate main body 812 that defines an interior 813). In other embodiments, both clamping sections of the clamping mechanism 800 may be configured similar to the second clamping section 820 described herein (i.e., each clamping section including two semi-circular sections 822*a*, 822*b*).

Figure 15A:
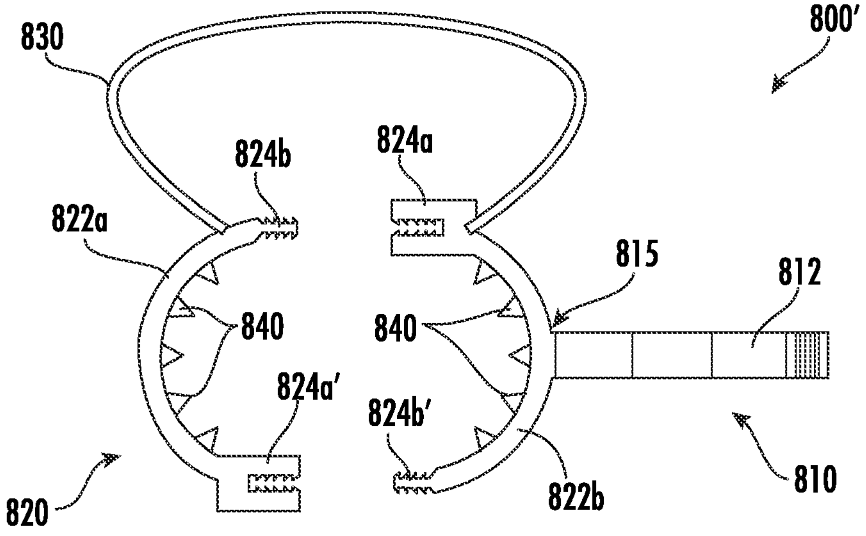
FIG. 15A is a top view of the clamping mechanism of FIG. 13 having embossed features.
Figure 15B:
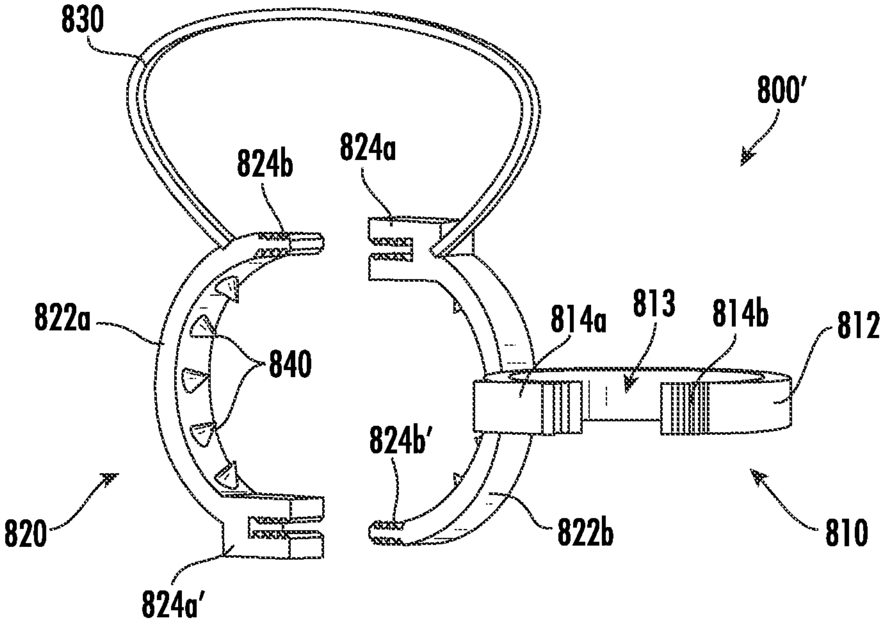
FIG. 15B is a perspective view of the clamping mechanism of FIG. 15A.

As shown in FIGS. 15A-15B, in some embodiments, each of the clamping sections 810, 820 of a clamping mechanism 800' may further comprise one or more embossed features 840 that corresponds to a respective embossed feature on the horizontal and/or vertical members 14, 50. The corresponding embossed features 840 may be configured to mate to help prevent the clamping mechanism 800' and horizontal/vertical members 14, 50 from moving (e.g., sliding) relative to one another. The embossed features 840 may be a slot, oval or round feature. For example, as shown in FIGS. 15A-15B, in some embodiments, the embossed features 840 may be conical shaped spikes (or teeth) that are configured fit into a round feature (not shown) on the horizontal and/or vertical members 14, 50 to prevent the clamping mechanism 800' from moving relative to the respective horizontal/vertical member 14, 50.

As described above, in some embodiments, the clamping mechanism 800, 800' may be formed of a non-metallic (e.g., polymeric) material. As an antenna frame (e.g., antenna frame 30 in FIG. 1) experiences high winds and/or a technician biases all of the antennas 40 off center on the vertical members 50, the vertical members 50 may want to twist relative to the horizontal members 14, thereby potentially creating a high-stress area in the clamping mechanism 800, 800'. Thus, in some embodiments, the clamping mechanism 800, 800' may further comprise metallic inserts (not shown) which are molded with the polymeric material to increase the structural integrity in these high-stress areas. For example, in some embodiments, a metallic insert may be used between the first clamping section 810 and the second clamping section 820 (i.e., at segment 815).

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A passive intermodulation reducing assembly for a telecommunications structure, the assembly comprising an antenna frame including a plurality of horizontal members and a plurality of vertical members mounted on the horizontal members, wherein at least one of the vertical members is formed of a fiber-reinforced polymer, and wherein a selected one of the fiber-reinforced polymer vertical members is mounted on a selected one of the plurality of horizontal members via a passive intermodulation reducing member, wherein the passive intermodulation reducing member comprises:

a metallic tubular member sized and configured to fit around a section of the selected fiber-reinforced polymer vertical member;

a polymeric member residing between the metallic tubular member and the selected fiber-reinforced polymer vertical member and extending past at least one end of the metallic tubular member; and a fastener configured to secure the selected fiber-reinforced polymer vertical member to a mount attached to the selected horizontal member, thereby providing a mechanical connection configured to dampen vibration between the selected fiber-reinforced polymer vertical member and the selected horizontal member.

2. The assembly of claim 1 wherein the polymeric member is a polyurethane foam.

3. The assembly of claim 1, wherein the plurality of horizontal members and the plurality of vertical members are formed of a polymeric material.

4. The assembly of claim 1, wherein the selected one of the fiber-reinforced polymer vertical members is configured to have at least one piece of telecommunications equipment mounted thereon.

5. A passive intermodulation reducing assembly for a telecommunications structure, the assembly comprising:

an antenna frame including a plurality of horizontal members and a plurality of vertical members, wherein the plurality of vertical members is mounted on the plurality of horizontal members; and a passive intermodulation reducing member that receives a selected one of the plurality of vertical members and mounts the selected vertical member to a selected one of the plurality of horizontal members, the passive intermodulation reducing member comprising:

a metallic tubular member;

a polymeric member residing between the metallic tubular member and the selected vertical member of the plurality of vertical members and extending past at least one end of the metallic tubular member; and a fastener configured to secure the selected vertical member of the plurality of vertical members to a mount attached to the selected horizontal member of the plurality of horizontal members, wherein the passive intermodulation reducing member provides a mechanical connection configured to dampen vibration between the selected vertical member and the selected horizontal member, thereby reducing passive intermodulation in the radio frequency environment around the telecommunications structure.

6. The assembly of claim 5, wherein the selected vertical member is formed of a fiber-reinforced polymer, and wherein the selected vertical member is mounted on the selected horizontal member of the plurality of horizontal members via the passive intermodulation reducing member.

7. The assembly of claim 6, wherein the metallic tubular member is sized and configured to fit around a section of the selected vertical member.

8. The assembly of claim 6, wherein the polymeric member resides between the metallic tubular member and the selected vertical member.

9. The assembly of claim 5, wherein the polymeric member is a polyurethane foam.

10. The assembly of claim 9, wherein the polyurethane foam fills a void space between the metallic tubular member and the selected vertical member to secure and hold the selected vertical member within the metallic tubular member.

11. The assembly of claim 5, wherein the fastener is a U-bolt secured around the metallic tubular member.

12. A passive intermodulation reducing assembly for a telecommunications structure, the assembly comprising:

an antenna frame including a plurality of horizontal members and a plurality of vertical members, wherein the plurality of vertical members is mounted on the plurality of horizontal members;

a mount secured to a selected one of the plurality of horizontal members, the mount having one or more apertures; and a passive intermodulation reducing member comprising:

a metallic tubular member sized and configured to fit around a section of a selected one of the plurality of vertical members;

a polymeric member residing between the metallic tubular member and the selected vertical member and extending past at least one end of the metallic tubular member; and a fastener configured to secure the selected vertical member to the mount attached to the selected one of the plurality of horizontal members, wherein the fastener is secured around the metallic tubular member and received by the one or more apertures of the mount to secure the selected vertical member to the selected horizontal member, and wherein the passive intermodulation reducing member provides a mechanical connection configured to dampen vibration between the selected vertical member and the selected horizontal member, thereby reducing passive intermodulation in the radio frequency environment around the telecommunications structure.

13. The assembly of claim 12, wherein the selected vertical member is formed of a fiber-reinforced polymer, and wherein the selected vertical member is mounted on the selected horizontal member via the passive intermodulation reducing member.

14. The assembly of claim 12, wherein the polymeric member is a polyurethane foam.

15. The assembly of claim 14, wherein the polyurethane foam fills a void space between the metallic tubular member and the selected vertical member to secure and hold the selected vertical member within the metallic tubular member.

16. The assembly of claim 12, wherein the fastener is a U-bolt secured around the metallic tubular member.

17. The assembly of claim 12, wherein the plurality of horizontal members and the plurality of vertical members are formed of a polymeric material.

* * * * *